US010414288B2

(12) United States Patent
Mangette

(10) Patent No.: US 10,414,288 B2
(45) Date of Patent: Sep. 17, 2019

(54) TRACTION SPEED RECOVERY BASED ON STEER WHEEL DYNAMIC

(71) Applicant: Crown Equipment Corporation, New Bremen, OH (US)

(72) Inventor: Stephen Mangette, Delphos, OH (US)

(73) Assignee: Crown Equipment Corporation, New Bremen, OH (US)

( * ) Notice: Subject to any disclaimer, the term of this patent is extended or adjusted under 35 U.S.C. 154(b) by 4 days.

(21) Appl. No.: 15/808,949

(22) Filed: Nov. 10, 2017

(65) Prior Publication Data

US 2018/0201156 A1   Jul. 19, 2018

Related U.S. Application Data

(60) Provisional application No. 62/445,889, filed on Jan. 13, 2017.

(51) Int. Cl.
  *B60L 15/20*   (2006.01)
  *B60T 8/175*   (2006.01)
  (Continued)

(52) U.S. Cl.
  CPC ............... *B60L 15/20* (2013.01); *B60L 3/08* (2013.01); *B60L 15/2036* (2013.01);
  (Continued)

(58) Field of Classification Search
  CPC . B60L 15/20; B60T 8/175; G06F 7/00; G06F 19/00; B62D 5/00; B62D 5/04; B60K 17/348; B60W 40/06
  See application file for complete search history.

(56) References Cited

U.S. PATENT DOCUMENTS 4,595,433 A   6/1986   Ford et al.
4,942,529 A   7/1990   Avitan et al.
  (Continued)

FOREIGN PATENT DOCUMENTS

CN   1695974 A   11/2005
DE   4311485 A1   10/1994
  (Continued)

OTHER PUBLICATIONS

Ryan J. Rink; Final Office Action; U.S. Appl. No. 15/234,120; dated Mar. 28, 2018; United States Patent and Trademark Office; Alexandria, Virginia.
  (Continued)

*Primary Examiner* — Yuri Kan
(74) *Attorney, Agent, or Firm* — Stevens & Showalter, L.L.P.

(57) ABSTRACT

Calculating a current target position value for controlling a traction speed of a materials handling vehicle, that includes receiving steering command signals; generating an output value proportional to a rate of change of the steering command signals; determining whether the output value is greater than or equal to a predetermined threshold; determining a raw target position value for controlling the traction speed of the materials handling vehicle; and calculating the current target position value based on: whether the output value is greater than or equal to a predetermined threshold, and whether the raw target position value is less than or equal to a previously calculated target position value for controlling the traction speed.

20 Claims, 19 Drawing Sheets

(51) Int. Cl.

| | | |
|---|---|---|
| *G06F 7/00* | (2006.01) | |
| *B60K 17/348* | (2006.01) | |
| *B62D 5/00* | (2006.01) | |
| *B62D 5/04* | (2006.01) | |
| *G06F 19/00* | (2018.01) | |
| *B66F 17/00* | (2006.01) | |
| *B60W 10/08* | (2006.01) | |
| *B60W 10/20* | (2006.01) | |
| *B66F 9/075* | (2006.01) | |
| *B60L 3/08* | (2006.01) | |
| *B60W 30/18* | (2012.01) | |

(52) U.S. Cl.
CPC ............ *B60W 10/08* (2013.01); *B60W 10/20* (2013.01); *B60W 30/18172* (2013.01); *B66F 9/07568* (2013.01); *B66F 9/07572* (2013.01); *B66F 17/003* (2013.01); *B60L 2200/42* (2013.01); *B60L 2240/12* (2013.01); *B60L 2240/24* (2013.01); *B60L 2250/24* (2013.01); *B60W 2300/121* (2013.01); *B60W 2710/081* (2013.01); *B60W 2710/083* (2013.01); *B60W 2710/207* (2013.01); *B60Y 2200/15* (2013.01); *Y02T 10/7258* (2013.01)

(56) References Cited

U.S. PATENT DOCUMENTS

| | | | |
|---|---|---|---|
| 5,258,914 | A | 11/1993 | Schmitt |
| 5,850,616 | A * | 12/1998 | Matsuno ............... B60T 8/175 701/82 |
| 6,799,652 | B2 | 10/2004 | Nissen et al. |
| 6,807,471 | B2 | 10/2004 | Fujimori |
| 6,971,470 | B2 | 12/2005 | McGoldrick |
| 7,017,689 | B2 | 3/2006 | Gilliland et al. |
| 7,023,174 | B2 | 4/2006 | Fromme et al. |
| 7,025,157 | B2 | 4/2006 | Lindsay et al. |
| 7,165,643 | B2 | 1/2007 | Bozem et al. |
| 7,278,509 | B2 | 10/2007 | Schröder et al. |
| 7,568,547 | B2 | 8/2009 | Yamada et al. |
| 7,599,776 | B2 | 10/2009 | Sonderegger et al. |
| 7,661,493 | B2 | 2/2010 | Rose |
| 7,665,555 | B2 | 2/2010 | Rose et al. |
| 7,706,947 | B2 | 4/2010 | Bozem et al. |
| 7,784,880 | B2 | 8/2010 | Glaeske et al. |
| 7,849,955 | B2 * | 12/2010 | Grabill ............... B66F 9/07509 180/411 |
| 7,979,189 | B2 | 7/2011 | Nihei |
| 7,980,352 | B2 | 7/2011 | Wetterer et al. |
| 8,140,228 | B2 | 3/2012 | McCabe et al. |
| 8,172,033 | B2 | 5/2012 | Corbett et al. |
| 8,230,976 | B2 | 7/2012 | Baldini |
| 8,235,161 | B2 | 8/2012 | Passeri et al. |
| 8,395,491 | B2 | 3/2013 | Kümmel et al. |
| 8,412,431 | B2 | 4/2013 | Wetterer et al. |
| 8,463,511 | B2 | 6/2013 | Uematsu et al. |
| 8,521,384 | B2 * | 8/2013 | O'Connor ............. A01G 20/30 701/69 |
| 8,649,953 | B2 | 2/2014 | Sherman |
| 8,694,194 | B2 | 4/2014 | Waltz et al. |
| 8,718,890 | B2 | 5/2014 | Wetterer et al. |
| 8,731,785 | B2 | 5/2014 | McCabe et al. |
| 8,788,156 | B2 | 7/2014 | Nishimura |
| 8,886,378 | B2 | 11/2014 | Hammer et al. |
| 8,892,294 | B2 | 11/2014 | Waltz et al. |
| 8,918,263 | B2 | 12/2014 | Zent et al. |
| 9,082,293 | B2 | 7/2015 | Wellman et al. |
| 9,421,963 | B2 | 8/2016 | Wetterer et al. |
| 9,868,445 | B2 | 1/2018 | Mangette et al. |
| 2003/0079932 | A1 * | 5/2003 | Ono ................... B62D 5/008 180/407 |
| 2003/0114970 | A1 * | 6/2003 | Hara ................... B62D 5/008 701/41 |
| 2005/0027427 | A1 | 2/2005 | Nagaya et al. |
| 2005/0072621 | A1 | 4/2005 | Hara et al. |
| 2005/0162114 | A1 | 7/2005 | Makaran |
| 2006/0052927 | A1 | 3/2006 | Watanabe et al. |
| 2006/0065470 | A1 | 3/2006 | Manken et al. |
| 2006/0102397 | A1 | 5/2006 | Buck et al. |
| 2006/0211535 | A1 | 9/2006 | Casey |
| 2007/0007080 | A1 | 1/2007 | Manthey et al. |
| 2007/0175693 | A1 | 8/2007 | Krimbacher |
| 2007/0212680 | A1 | 9/2007 | Friedrichs et al. |
| 2007/0225885 | A1 | 9/2007 | Hara et al. |
| 2009/0194358 | A1 | 8/2009 | Corbett et al. |
| 2009/0222156 | A1 * | 9/2009 | Krueger ............... B60L 7/26 701/22 |
| 2010/0025144 | A1 | 2/2010 | Huang et al. |
| 2012/0123614 | A1 | 5/2012 | Laws et al. |
| 2012/0136539 | A1 * | 5/2012 | Bryant ............... B60T 8/175 701/42 |
| 2013/0138290 | A1 | 5/2013 | Falkenstein |
| 2013/0338886 | A1 | 12/2013 | Callea et al. |
| 2014/0143607 | A1 | 5/2014 | Vogt et al. |
| 2014/0163804 | A1 | 6/2014 | Kaneko et al. |
| 2014/0188324 | A1 | 7/2014 | Waltz et al. |
| 2014/0195127 | A1 | 7/2014 | Hoffman |
| 2014/0209406 | A1 | 7/2014 | Wetterer et al. |
| 2014/0277871 | A1 | 9/2014 | Goncalves et al. |
| 2014/0278021 | A1 | 9/2014 | Fackler et al. |
| 2015/0032423 | A1 | 1/2015 | Tang |
| 2015/0090507 | A1 | 4/2015 | Okada et al. |
| 2015/0096826 | A1 | 4/2015 | Eden et al. |
| 2015/0158522 | A1 | 6/2015 | Thayer |
| 2015/0274196 | A1 | 10/2015 | Park et al. |
| 2015/0291155 | A1 | 10/2015 | Jonsson et al. |
| 2015/0331061 | A1 | 11/2015 | Hirschbold et al. |
| 2016/0016482 | A1 | 1/2016 | Lee |
| 2016/0129803 | A1 | 5/2016 | Grewal et al. |
| 2016/0160470 | A1 | 6/2016 | Kishimoto et al. |
| 2016/0264387 | A1 | 9/2016 | Yoon et al. |
| 2016/0272081 | A1 | 9/2016 | Lee |
| 2016/0289056 | A1 | 10/2016 | Castaneda et al. |
| 2017/0001663 | A1 | 1/2017 | Moberg |
| 2017/0015330 | A1 | 1/2017 | Armbruster et al. |
| 2017/0028993 | A1 | 2/2017 | Addison et al. |
| 2017/0028994 | A1 | 2/2017 | Addison et al. |
| 2017/0029023 | A1 | 2/2017 | Otterbein |
| 2017/0043765 | A1 | 2/2017 | Mangette et al. |
| 2017/0043786 | A1 | 2/2017 | Mangette et al. |
| 2017/0043787 | A1 | 2/2017 | Mangette et al. |
| 2017/0043804 | A1 | 2/2017 | Mangette et al. |
| 2018/0134310 | A1 | 5/2018 | Benak et al. |

FOREIGN PATENT DOCUMENTS

| | | |
|---|---|---|
| DE | 19702313 C1 | 4/1998 |
| DE | 10114600 A1 | 1/2002 |
| DE | 10204955 A1 | 8/2002 |
| DE | 10205632 A1 | 10/2002 |
| DE | 10204742 A1 | 7/2003 |
| DE | 10301435 A1 | 12/2003 |
| DE | 10358907 A1 | 7/2004 |
| DE | 102004001318 A1 | 8/2004 |
| DE | 10354663 A1 | 6/2005 |
| DE | 102004028828 A1 | 1/2006 |
| DE | 102005022089 A1 | 11/2006 |
| DE | 102006035863 A1 | 2/2008 |
| DE | 102006041254 A1 | 3/2008 |
| DE | 102006050506 A1 | 4/2008 |
| DE | 102008012007 A1 | 9/2009 |
| DE | 102010007615 A1 | 9/2010 |
| DE | 102009020157 A1 | 11/2010 |
| DE | 112009004544 T5 | 8/2012 |
| DE | 102011013248 A1 | 9/2012 |
| DE | 102012209788 A1 | 12/2013 |
| DE | 102013011883 A1 | 1/2015 |
| DE | 10355933 B4 | 4/2015 |
| EP | 0436567 B1 | 10/1992 |
| EP | 1089901 B1 | 1/2002 |
| EP | 1186459 A1 | 3/2002 |
| EP | 1281600 A2 | 2/2003 |

(56) References Cited

FOREIGN PATENT DOCUMENTS

| | | |
|---|---|---|
| EP | 1183579 B1 | 10/2004 |
| EP | 1607309 A2 | 12/2005 |
| EP | 1301387 B1 | 3/2006 |
| EP | 0930216 B1 | 7/2006 |
| EP | 1268257 B1 | 7/2006 |
| EP | 1360103 B1 | 8/2006 |
| EP | 1741615 A1 | 1/2007 |
| EP | 1325857 B1 | 5/2007 |
| EP | 1527980 B1 | 12/2009 |
| EP | 2218627 A1 | 8/2010 |
| EP | 1880919 B1 | 5/2011 |
| EP | 1594026 B1 | 7/2011 |
| EP | 2145812 B1 | 11/2011 |
| EP | 1399344 B1 | 8/2012 |
| EP | 2164746 B1 | 8/2012 |
| EP | 2508403 A1 | 10/2012 |
| EP | 2404803 A1 | 11/2012 |
| EP | 2172359 B1 | 12/2012 |
| EP | 2551161 A2 | 1/2013 |
| EP | 2368785 B1 | 9/2013 |
| EP | 2483130 B1 | 11/2013 |
| EP | 2664515 A1 | 11/2013 |
| EP | 2582564 B1 | 2/2014 |
| EP | 2374692 B1 | 3/2014 |
| EP | 2630023 B1 | 5/2014 |
| EP | 2674387 B1 | 5/2015 |
| EP | 2613986 B1 | 8/2016 |
| EP | 3078574 A1 | 10/2016 |
| FR | 2862594 A1 | 5/2005 |
| GB | 2042217 A | 9/1980 |
| GB | 2125577 A | 3/1984 |
| GB | 2370819 A | 12/2001 |
| GB | 2391848 A | 2/2004 |
| GB | 2413547 B | 6/2007 |
| GB | 2425996 B | 1/2009 |
| GB | 2523462 A | 8/2015 |
| JP | 11310399 A | 11/1999 |
| JP | 2000142065 A | 5/2000 |
| JP | 2003306160 A | 10/2003 |
| JP | 2005253143 A | 9/2005 |
| JP | 2010095354 A | 4/2010 |
| JP | 2010195118 A | 9/2010 |
| JP | 2012254705 A | 12/2012 |
| JP | 2013126868 A | 6/2013 |
| JP | 5418705 B2 | 2/2014 |
| KR | 100225961 B1 | 10/1999 |
| KR | 2015004511 A | 1/2015 |
| WO | 200202389 A1 | 1/2002 |
| WO | 2004098941 A1 | 11/2004 |
| WO | 2011027758 A1 | 3/2011 |
| WO | 2012032133 A1 | 3/2012 |
| WO | 2013006742 A1 | 1/2013 |
| WO | 2013033179 A1 | 3/2013 |
| WO | 2014189877 A1 | 11/2014 |
| WO | 2015152276 A1 | 10/2015 |
| WO | 2015178843 A1 | 11/2015 |
| WO | 2015178845 A1 | 11/2015 |
| WO | 2017030774 A1 | 2/2017 |
| WO | 2017030879 A1 | 2/2017 |

OTHER PUBLICATIONS

Ryan J. Rink; Notice of Allowance and Fees Due; U.S. Appl. No. 15/234,168; dated Mar. 29, 2018; United States Patent and Trademark Office; Alexandria, Virginia.

Paul Pemberton; International Search Report and Written Opinion; International application No. PCT/US2017/060990; dated Mar. 29, 2018; European Patent Office; Rijswijk, Netherlands.

Ryan J. Rink; Corrected Notice of Allowability; U.S. Appl. No. 15/234,168; dated Apr. 19, 2018; United States Patent and Trademark Office; Alexandria, Virginia.

Janusch, Stefan; International Search Report and Written Opinion; International Application No. PCT/US2016/044981; dated Nov. 9, 2016; European Patent Office; Rijswijk, Netherlands.

Plenk, Rupert; International Search Report and Written Opinion; International Application No. PCT/US2016/046456; dated Nov. 25, 2016; European Patent Office; Rijswijk, Netherlands.

Plenk, Rupert; International Search Report and Written Opinion; International Application No. PCT/US2016/046460; dated Nov. 25, 2016; European Patent Office; Rijswijk, Netherlands.

Plenk, Rupert; International Search Report and Written Opinion; International Application No. PCT/US2016/046466; dated Nov. 25, 2016; European Patent Office; Rijswijk, Netherlands.

Bendidi, Rachid; Notice of Allowance; U.S. Appl. No. 15/234,152; dated Aug. 31, 2017; United States Patent and Trademark Office; Alexandria, Virginia.

Rink, Ryan J.; Office Action; U.S. Appl. No. 15/234,120; dated Nov. 1, 2017; United States Patent and Trademark Office; Alexandria, Virginia.

Luzcando, Gissele; EIC 3600 Search Report; U.S. Appl. No. 15/234,152; dated Aug. 8, 2017; STIC Scientific & Technical Information Center; United States Patent and Trademark Office, Alexandria, Virginia.

Song, Dafeng et al.; "Software-in-the-loop simulation of traction control system"; Nongye Jixie Xuebao (Transactions of the Chinese Society of Agricultural Machinery) 36.8; Aug. 2005; pp. 27-29—Reference is from EIC 3600 Search Report.

Matveev, Alexey S.; "Nonlinear sliding mode control of an unmanned agricultural tractor in the presence of sliding and control saturation"; Robotics and Autonomous Systems; Sep. 2013; pp. 973-987—Reference is from EIC 3600 Search Report.

Keen, Alex et al.; "Improvements to the tractive efficiency of agricultural tractors carrying out cultivations"; American Society of Agricultural and Biological Engineers Annual International Meeting 2009; 7; pp. 4669-4682—Reference is from EIC 3600 Search Report.

Rink, Ryan J.; Office Action; U.S. Appl. No. 15/234,168; dated Nov. 22, 2017; united States Patent and Trademark Office; Alexandria, VA.

U.S. Appl. No. 15/808,962; entitled "High Speed Straight Ahead Tiller Desensitization;" filed Nov. 10, 2017 by Stephen Mangette.

Rink, Ryan J.; Office Action; U.S. Appl. No. 15/224,945; dated Jul. 12, 2018; United States Patent and Trademark Office, Alexandria, VA.

Rink, Ryan J.; Office Action; U.S. Appl. No. 15/234,120; dated Jul. 20, 2018; United States Patent and Trademark Office, Alexandria, VA.

Bruce Sheppard; International Search Report and Written Opinion; International Application No. PCT/US2017/060988; dated Feb. 26, 2018; European Patent Office; Rijswijk, Netherlands.

Athina Nickitas-Etienne; International Preliminary Report on Patentability; International Application No. PCT/US2016/04498; dated Feb. 20, 2018; International Bureau of WIPO; Geneva, Switzerland.

Mineko Mohri; International Preliminary Report on Patentability; International Application No. PCT/US2016/046456; dated Feb. 20, 2018; International Bureau of WIPO; Geneva, Switzerland.

Mineko Mohri; International Preliminary Report on Patentability; International Application No. PCT/US2016/046460; dated Feb. 20, 2018; International Bureau of WIPO; Geneva, Switzerland.

Simin Baharlou; International Preliminary Report on Patentability; International Application No. PCT/US2016/046466; dated Feb. 20, 2018; International Bureau of WIPO; Geneva, Switzerland.

Rink, Ryan J.; Final Office Action; U.S. Appl. No. 15/234,120; dated Dec. 28, 2018; United States Patent and Trademark Office, Alexandria, VA.

Whalen, Michael F.; Final Office Action; U.S. Appl. No. 15/224,945; dated Feb. 7, 2019; United States Patent and Trademark Office, Alexandria, VA.

* cited by examiner

| | x[t] | i1[t] | sum1[t] | i2[t] | g1 | p1[t] | s2[t] | y[t] |
|---|---|---|---|---|---|---|---|---|
| | | | | | 0.9 | | | 0.2 |
| 1 | 1.5 | 1.5 | 1.3 | 0 | | 0 | 1.5 | 1.5 |
| 2 | 3.2 | 3.2 | 1.7 | 0 | | 0 | 3.2 | 3.2 |
| 3 | 3.5 | 3.5 | 0.3 | 0 | | 0 | 3.5 | 3.5 |
| 4 | 6 | 6 | 2.5 | 0 | | 0 | 6 | 6 |
| 5 | 11 | 11 | 5 | 0 | | 0 | 11 | 11 |
| 6 | 3 | 0 | -11 | -11 | | -9.9 | 9.9 | 9.9 |
| 7 | 2 | 0 | -9.9 | -9.9 | | -8.91 | 8.91 | 8.91 |
| 8 | 1 | 0 | -8.91 | -8.91 | | -8.019 | 8.019 | 8.019 |
| 9 | 0 | 0 | -8.019 | -8.019 | | -7.2171 | 7.2171 | 7.2171 |
| 10 | 3.2 | 0 | -7.2171 | -7.2171 | | -6.49539 | 6.49539 | 6.49539 |
| 11 | 3.5 | 0 | -6.49539 | -6.49539 | | -5.84585 | 5.845851 | 5.845851 |
| 12 | 6 | 6 | 0.154149 | 0 | | 0 | 6 | 6 |
| 13 | 11 | 11 | 5 | 0 | | 0 | 11 | 11 |
| 14 | 3 | 0 | -11 | -11 | | -9.9 | 9.9 | 9.9 |
| 15 | 0 | 0 | -9.9 | -9.9 | | -8.91 | 8.91 | 8.91 |
| 16 | 0 | 0 | -8.91 | -8.91 | | -8.019 | 8.019 | 8.019 |
| 17 | 0 | 0 | -8.019 | -8.019 | | -7.2171 | 7.2171 | 7.2171 |
| 18 | 0 | 0 | -7.2171 | -7.2171 | | -6.49539 | 6.49539 | 6.49539 |
| 19 | 0 | 0 | -6.49539 | -6.49539 | | -5.84585 | 5.845851 | 5.845851 |
| 20 | 0 | 0 | -5.84585 | -5.845851 | | -5.26127 | 5.2612659 | 5.2612659 |

FIG. 3F

|    | g[t] | s3[t]   | i3[t]  | g2  | p2[t]  | h[t]   |
|----|------|---------|--------|-----|--------|--------|
|    |      |         |        | 0.9 |        | 80     |
| 1  | 15.5 | -64.5   | -64.5  |     | -58.05 | 73.55  |
| 2  | 15   | -58.55  | -58.55 |     | -52.7  | 67.695 |
| 3  | 14.5 | -53.195 | -53.2  |     | -47.88 | 62.376 |
| 4  | 14   | -48.376 | -48.38 |     | -43.54 | 57.538 |
| 5  | 13.5 | -44.038 | -44.04 |     | -39.63 | 53.134 |
| 6  | 13   | -40.134 | -40.13 |     | -36.12 | 49.121 |
| 7  | 12.5 | -36.621 | -36.62 |     | -32.96 | 45.459 |
| 8  | 12   | -33.459 | -33.46 |     | -30.11 | 42.113 |
| 9  | 11.5 | -30.613 | -30.61 |     | -27.55 | 39.052 |
| 10 | 11   | -28.052 | -28.05 |     | -25.25 | 36.246 |
| 11 | 10.5 | -25.746 | -25.75 |     | -23.17 | 33.672 |
| 12 | 10   | -23.672 | -23.67 |     | -21.3  | 31.305 |
| 13 | 9.5  | -21.805 | -21.8  |     | -19.62 | 29.124 |
| 14 | 9    | -20.124 | -20.12 |     | -18.11 | 27.112 |
| 15 | 8.5  | -18.612 | -18.61 |     | -16.75 | 25.251 |
| 16 | 8    | -17.251 | -17.25 |     | -15.53 | 23.525 |
| 17 | 7.5  | -16.025 | -16.03 |     | -14.42 | 21.923 |
| 18 | 7    | -14.923 | -14.92 |     | -13.43 | 20.431 |
| 19 | 6.5  | -13.931 | -13.93 |     | -12.54 | 19.038 |
| 20 | 6    | -13.038 | -13.04 |     | -11.73 | 17.734 |

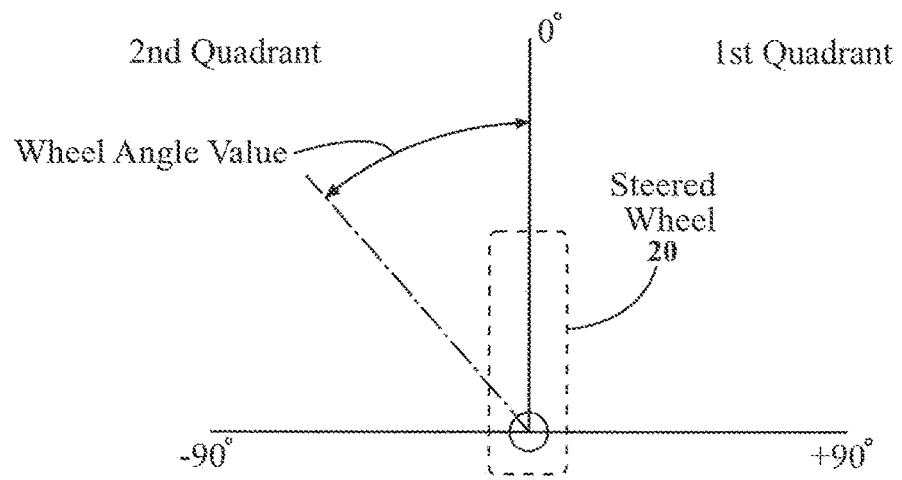
FIG. 6A
FIG. 6B
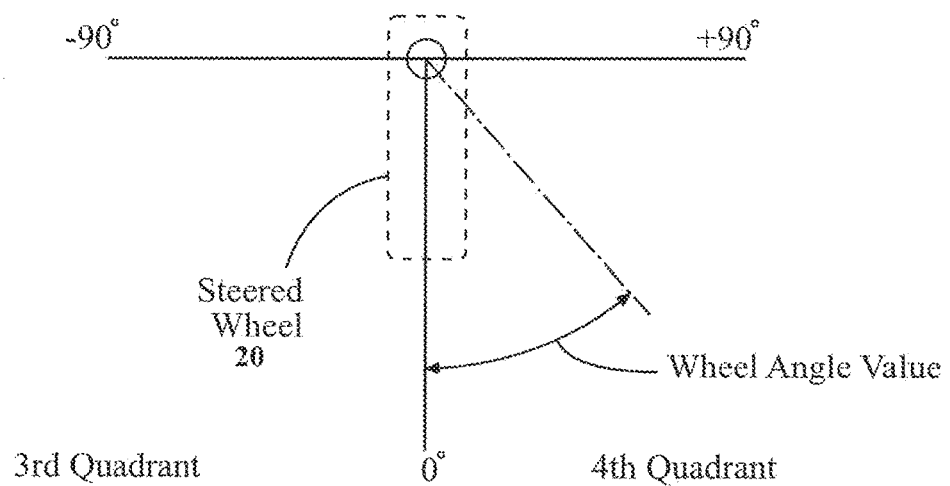

TRACTION SPEED RECOVERY BASED ON STEER WHEEL DYNAMIC

RELATED APPLICATION

This application is related to and claims the benefit of provisional patent application entitled "TRACTION SPEED RECOVERY BASED ON STEER WHEEL DYNAMIC," Application Ser. No. 62/445,889, filed Jan. 13, 2017, the disclosure of which is incorporated by reference herein in their entirety.

FIELD OF THE INVENTION

The present invention relates generally to diagnostics of a materials handling vehicle, and, more particularly, to controlling a traction speed of the vehicle.

BACKGROUND OF THE INVENTION

Forklifts and other types of industrial vehicles are expected to operate under a variety of different conditions. Further, such vehicles typically include a number of different functional systems such as a traction system to control a travelling speed of the vehicle and a steering system to control a direction in which the vehicle travels.

Under various vehicle operating conditions, it may be beneficial to vary the manner in which the traction wheel and steered wheel of the vehicle are controlled to reduce forces exerted on a vehicle operator due to vehicle movement.

BRIEF SUMMARY OF THE INVENTION

In accordance with a first aspect of the present invention, a computer-implemented method is provided for controlling a traction motor of a materials handling vehicle. The method comprises: receiving, by a processor, steering command signals from a steering control input sensor of the materials handling vehicle; generating, by the processor, a current output value proportional to a rate of change of the steering command signals; determining, by the processor, a raw target steering angle value; calculating, by the processor, a current target steering angle value based on: the current output value compared to a predetermined threshold, and the raw target steering angle value compared to a previously calculated target steering angle value; calculating, by the processor, a traction speed limit based on the calculated current target steering angle value; calculating, by the processor, a traction setpoint based on the traction speed limit; and controlling the traction motor of the materials handling vehicle based on the traction setpoint.

The calculated current target angle value equals the raw target angle value when the raw target angle value is greater than the previously calculated target angle value.

The calculated current target angle value equals the previously calculated target angle value when: the current output value is greater than or equal to the predetermined threshold; and the raw target angle value is less than or equal to the previously calculated target angle value.

The calculated current target angle value equals a value that is closer to the raw target angle value than the previously calculated target angle value when: the current output value is less than the predetermined threshold; and the raw target angle value is less than or equal to the previously calculated target angle value.

The calculated current target angle value may be calculated by applying a smoothing filter function to the raw target angle value. The smoothing filter function may comprise an adjustable multiplier coefficient.

Generating a current output value proportional to a rate of change of the steering command signals may comprise: calculating, by the processor, a current input value proportional to a rate of change of the steering command signals; comparing the current input value to a previous output value; if the current input value is equal to or less than the previous output value, calculating by the processor a current output value by multiplying the previous output value by a predetermined decay rate of a filter; and if the input value is greater than the previous output value, setting the current output value equal to the current input value.

Determining, by the processor, whether the current output value is greater than or equal to the predetermined threshold.

The current target angle value may be calculated based on: whether the current output value is greater than or equal to the predetermined threshold, and whether the raw target angle value is less than or equal to the previously calculated target angle value.

Controlling the traction motor may comprise controlling at least one of a speed of the traction motor or a torque of the traction motor.

In accordance with a second aspect of the present invention, a system is provided for controlling a traction motor of a materials handling vehicle. The system may comprise: a steering control input sensor of the materials handling vehicle; a processor coupled to memory, wherein the memory stores program code that is executed by the processor to: receive steering command signals from the steering control input sensor of the materials handling vehicle; generate a current output value proportional to a rate of change of the steering command signals; determine a raw target angle value; calculate a current target angle value based on: the current output value compared to a predetermined threshold, and the raw target angle value compared to a previously calculated target angle value; calculate a traction speed limit based on the calculated current target angle value; and calculate a traction setpoint based on the traction speed limit. A traction controller may control the traction motor of the materials handling vehicle based on the traction setpoint. The traction speed limit may be a traction wheel speed limit or a traction motor speed limit.

The calculated current target angle value equals the raw target angle value when the raw target angle value is greater than the previously calculated target angle value.

The calculated current target angle value equals the previously calculated target angle value when: the current output value is greater than or equal to the predetermined threshold; and the raw target angle value is less than or equal to the previously calculated target angle value.

The calculated current target angle value equals a value that is closer to the raw target angle value than the previously calculated target angle value when: the current output value is less than the predetermined threshold; and the raw target angle value is less than or equal to the previously calculated target angle value.

The calculated current target angle value may be calculated by applying a smoothing filter function to the raw target angle value. The smoothing filter function may comprise an adjustable multiplier coefficient.

The processor when executing the program code to generate a current output value proportional to a rate of change of the steering command signals calculates a current input value proportional to a rate of change of the steering command signals; compares the current input value to a previous output value; and if the current input value is equal to or less than the previous output value, calculates a current output value by multiplying the previous output value by a predetermined decay rate of a filter; and if the input value is greater than the previous output value, sets the current output value equal to the current input value.

The memory stores program code that is executed by the processor to: determine whether the current output value is greater than or equal to the predetermined threshold.

The current target angle value may be calculated based on: whether the current output value is greater than or equal to the predetermined threshold, and whether the raw target angle value is less than or equal to the previously calculated target angle value.

The traction controller may control at least one of a speed of the traction motor or a torque of the traction motor.

In accordance with a third aspect of the invention, a system is provided for controlling a traction motor of a materials handling vehicle. The system may comprise: a steering control input sensor of the materials handling vehicle; and a processor configured to: receive steering command signals from the steering control input sensor of the materials handling vehicle; generate a current output value proportional to a rate of change of the steering command signals; determine a raw target steering angle value; calculate a current target steering angle value based on: the current output value compared to a predetermined threshold, and the raw target steering angle value compared to a previously calculated target steering angle value; calculate a traction speed limit based on the calculated current target steering angle value; and calculate a traction setpoint based on the traction speed limit. A traction controller may control the traction motor of the materials handling vehicle based on the traction setpoint. Any of the features described in relation to the second aspect of the invention are equally applicable to the present aspect.

In accordance with a fourth aspect of the present invention, a vehicle is provided that comprises the system according to the second or third aspect of the present invention.

In accordance with a fifth aspect of the present invention, a method is provided for controlling a traction motor of a materials handling vehicle. The method comprises: receiving steering command signals from a steering control input sensor of the materials handling vehicle; generating a current output value proportional to a rate of change of the steering command signals; determining a raw target steering angle value; calculating a current target steering angle value based on: the current output value compared to a predetermined threshold, and the raw target steering angle value compared to a previously calculated target steering angle value; calculating a traction speed limit based on the calculated current target steering angle value; calculating a traction setpoint based on the traction speed limit; and controlling the traction motor of the materials handling vehicle based on the traction setpoint. Any of the features described in relation to the first aspect of the invention are equally applicable to the present aspect.

BRIEF DESCRIPTION OF THE SEVERAL VIEWS OF THE DRAWINGS

FIG. 3A-FIG. 3I depicts flowcharts of an example algorithm for calculating a target wheel angle in accordance with the principles of the present invention.

FIGS. 6A and 6B illustrate a frame of reference for measuring or calculating a value related to a steered wheel angle in accordance with the principles of the present invention.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
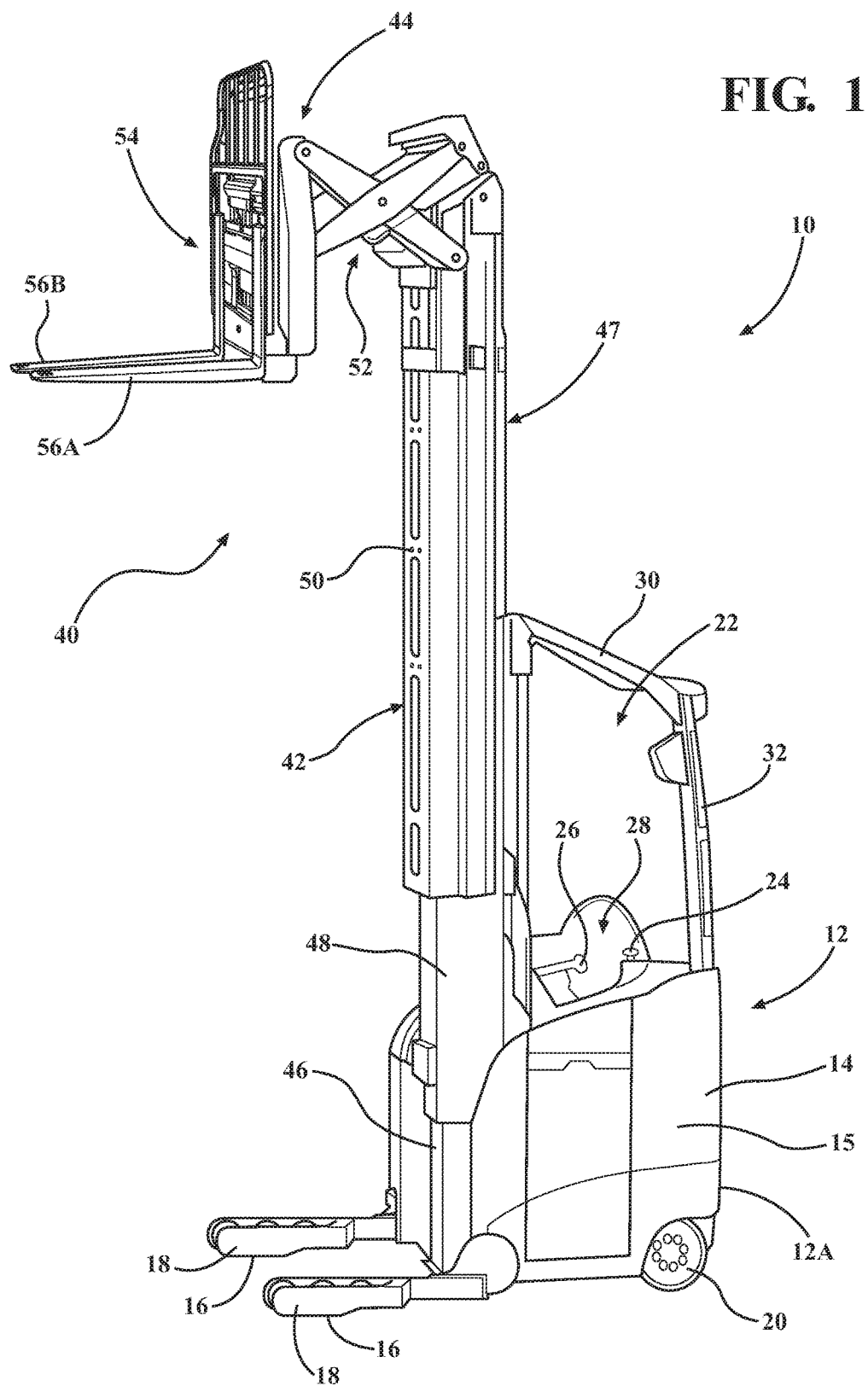
FIG. 1 is a perspective view of a materials handling vehicle according to an aspect of the present invention.

Referring now to FIG. 1, a materials handling vehicle 10 (hereinafter "vehicle") is shown. While the present invention is described herein with reference to the illustrated vehicle 10, which comprises a forklift truck, it will be apparent to those skilled in the art that the present invention may be used in a variety of other types of materials handling vehicles.

The vehicle 10 includes a main body or power unit 12, which includes a frame 14 defining a main structural component of the vehicle 10 and which houses a battery 15. The vehicle 10 further comprises a pair of fork-side support wheels 16 coupled to first and second outriggers 18, a driven and steered wheel 20 mounted near a first corner at a rear 12A of the power unit 12, and a caster wheel (not shown) mounted to a second corner at the rear 12A of the power unit 12. The wheels 16, 20 allow the vehicle 10 to move across a floor surface.

An operator's compartment 22 is located within the power unit 12 for receiving an operator driving the vehicle 10. A tiller knob 24 is provided within the operator's compartment 22 for controlling steering of the vehicle 10. The speed and direction of movement (forward or reverse) of the vehicle 10 are controlled by the operator via a multi-function control handle 26 provided adjacent to an operator seat 28, which control handle 26 may control one or more other vehicle functions as will be appreciated by those having ordinary skill in the art. The vehicle 10 further includes an overhead guard 30 including a vertical support structure 32 affixed to the vehicle frame 14.

A load handling assembly 40 of the vehicle 10 includes, generally, a mast assembly 42 and a carriage assembly 44, which is movable vertically along the mast assembly 42. The mast assembly 42 is positioned between the outriggers 18 and includes a fixed mast member 46 affixed to the frame 14, and nested first and second movable mast members 48, 50. It is noted that the mast assembly 42 may include additional or fewer movable mast members than the two shown in FIG. 1, i.e., the first and second movable mast members 48, 50. The carriage assembly 44 includes conventional structure including a reach assembly 52, a fork carriage 54, and fork structure comprising a pair of forks 56A, 56B. A movable assembly 47 as defined herein includes the lower and upper movable mast members 48, 50 and the carriage assembly 44. The mast assembly 42 may be configured as the monomast described in U.S. Pat. No. 8,714,311 to Steven C. Billger et al., granted on May 6, 2014 and assigned to the applicant, Crown Equipment Corporation, the entire disclosure of which is hereby incorporated by reference herein.

The vehicle 10 of FIG. 1 is provided by way of example and many different types of materials handling vehicles are contemplated within the scope of the present invention. As described in detail below, aspects of a vehicle control module are provided which allow a number of identical components to be utilized on various vehicles even though the vehicles may be of different types.

Figure 2A:
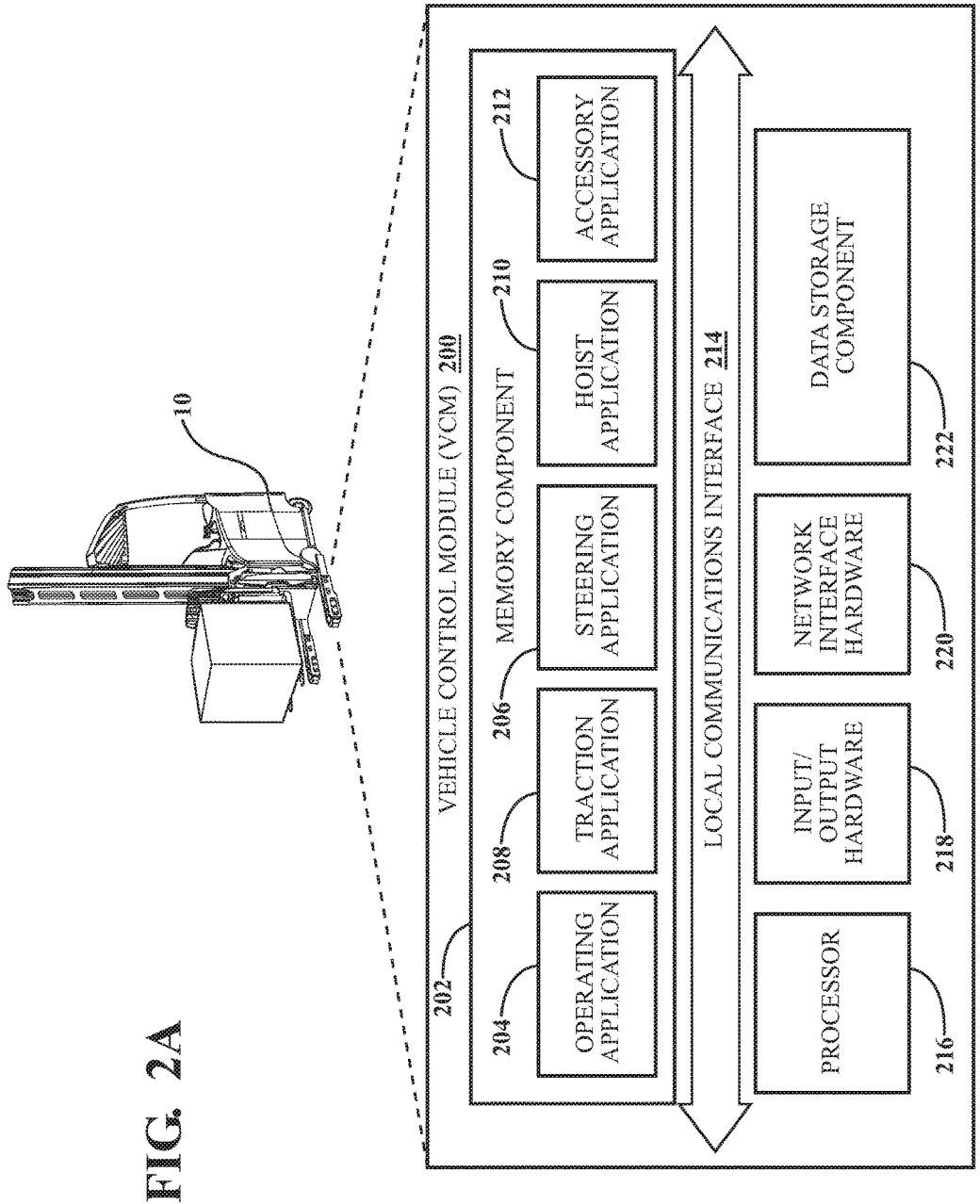
FIG. 2A depicts a computing environment for providing control logic in a vehicle control module (VCM) of the vehicle of FIG. 1.

FIG. 2A depicts a block-level view of a computing environment for providing control logic and software applications in a vehicle control module (VCM) 200, according to one or more embodiments shown and described herein. The vehicle control module 200 and the way it interfaces with various operator controls and other functional systems of the vehicle 10 may be similar to control structure disclosed in U.S. Patent Publication Nos. 2010/0228428 and 2014/0188324, the disclosures of which are incorporated herein by reference in their entireties. The VCM is one of a number of cooperating modules, such as, in addition to a traction control module (TCM) or a steering control module (SCM), that cooperatively control operation of the vehicle 10. Each of the cooperating modules comprise one or more respective processors, memories storing executable program code, and other circuitry configured to perform their individual functions, as well as communicate with one another, as described in detail below. The TCM may also be referred to herein as a "traction controller" and the SCM may also be referred to herein as a "steering controller".

In the illustrated embodiment, the VCM 200 includes one or more processors or microcontrollers 216, input/output hardware 218, network interface hardware 220, a data storage component 222, and a memory component 202. The data storage component 222 and the memory component 202 may each be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Any stored information that is intended to be available after the vehicle 10 is shutdown and restarted may beneficially be stored in non-volatile memory. Also, depending on the particular embodiment, the non-transitory computer-readable medium, mentioned above, may reside within the VCM 200 and/or external to the VCM 200.

Additionally, the memory component 202 may store software or applications that can be executed (i.e., using executable code) by the one or more processors or microcontrollers 216. Thus, the memory component 202 may store an operating application or logic 204, a traction application or logic 208, a steering application or logic 206, a hoist application or logic 210, and accessory application(s) or logic 212. The operating logic 204 may include an operating system and other software such as, for example, diagnostic-related applications for managing components of the VCM 200. The traction application or logic 208 may be configured with one or more algorithms and parameters for facilitating optimal traction control for the vehicle 10. The steering application or logic 206 may be configured with one or more algorithms and parameters for facilitating optimal steering control of the vehicle 10. The hoist application or logic 210 may include one or more algorithms and parameters for facilitating optimal hoist control of the vehicle 10, which acts as the primary load handling assembly system used to raise and lower the moveable assembly 47 of the vehicle 10. Additionally, the accessory application or logic 212 may include one or more algorithms and parameters for providing control of accessories of the vehicle 10 such as an auxiliary load handling assembly system, which performs additional tasks such as tilt and sideshift of the carriage assembly 44. A local communication interface 214 is also included in FIG. 2A and may be implemented as a bus or other communication interface to facilitate communication among the components of the VCM 200.

The one or more processors or microcontrollers 216 may include any processing component operable to receive and execute instructions (such as program code from the data storage component 222 and/or the memory component 202). The processors or microcontrollers 216 may comprise any kind of a device which receives input data, processes that data through computer instructions, and generates output data. Such a processor can be a microcontroller, a hand-held device, laptop or notebook computer, desktop computer, microcomputer, digital signal processor (DSP), mainframe, server, cell phone, personal digital assistant, other programmable computer devices, or any combination thereof. Such processors can also be implemented using programmable logic devices such as field programmable gate arrays (FPGAs) or, alternatively, realized as application specific integrated circuits (ASICs) or similar devices. The term "processor" is also intended to encompass a combination of two or more of the above recited devices, e.g., two or more microcontrollers.

The input/output hardware 218 may include and/or be configured to interface with a monitor, positioning system, keyboard, touch screen, mouse, printer, image capture device, microphone, speaker, gyroscope, compass, and/or other device for receiving, sending, and/or presenting data. The network interface hardware 220 may include and/or be configured for communicating with any wired or wireless networking hardware, including an antenna, a modem, LAN port, wireless fidelity (Wi-Fi) card, WiMax card, mobile communications hardware, and/or other hardware for communicating with other networks and/or devices. From this connection, communication may be facilitated between the VCM 200 and other computing devices including other components coupled with a CAN bus or similar network on the vehicle 10.

It should be understood that the components illustrated in FIG. 2A are merely exemplary and are not intended to limit the scope of this disclosure. While the components in FIG. 2A are illustrated as residing within the VCM 200, this is merely an example. In some embodiments, one or more of the components may reside external to the VCM 200. It should also be understood that while the VCM 200 in FIG. 2A is illustrated as a single device; this is also merely an example. In some embodiments, the traction application 208, the steering application 206, the hoist application 210, and/or the accessory application 212 may reside on different devices. Additionally, while the VCM 200 is illustrated with the traction application 208, the steering application 206, the hoist application 210, and the accessory application 212 as separate logical components, this is also an example. In some embodiments, a single, composite software application may cause the VCM 200 to provide the described functionality.

This application incorporates by reference to each of commonly assigned and co-pending U.S. patent application Ser. No. 15/234,120, filed on Aug. 11, 2016, entitled MODEL BASED DIAGNOSTICS BASED ON TRACTION MODEL; U.S. patent application Ser. No. 15/234,152, filed on Aug. 11, 2016, entitled DIAGNOSTIC SUPERVISOR TO DETERMINE IF A TRACTION SYSTEM IS IN A FAULT CONDITION; and U.S. patent application Ser. No. 15/234,168, filed on Aug. 11, 2016, entitled STEERING AND TRACTION APPLICATIONS FOR DETERMINING A STEERING CONTROL ATTRIBUTE AND A TRACTION CONTROL ATTRIBUTE.

It also should be understood that the VCM 200 may communicate with various sensors and other control circuitry of the vehicle 10 to coordinate the various conditions of manual operation and automatic operation of the vehicle 10.

In the description below, the following terms are used and are intended to convey the following definitions:

steering command signals: sensor output signal values from the operator steering mechanism.

Wheel_Angle_Cmd: a value generated by the steering application and is a transformation of a digitized value of the steering control input into units that reflect an angle/angular velocity value.

Raw Wheel_Angle_Target, or raw target steering angle $\phi_T$: based on the operator's input, this is a value generated by the steering application. Depending on the current operation of a vehicle its value can be one of either the Wheel_Angle_Cmd or a Wheel_Angle.

Wheel_Angle_Target, or target steering angle $\Theta_T$: based on the operator's input, the operating conditions of the vehicle, and the raw target steering angle $\phi_T$ this is a value calculated by the steering application and provided to the traction application in order to calculate a second Trx_Speed_Limit$_2$.

Wheel_Angle_Limit: a highest allowable steered wheel angle, generated by the steering application based on the measured value of the traction wheel/motor speed and can be used to modify the Wheel_Angle_Setpoint in order to stay within a desired Wheel Angle-to-Traction Speed relationship.

Wheel_Angle_Setpoint, or steering setpoint $\omega_1$ or $\theta_1$: a value generated by the steering application, based on the operator's input, but modified based on traction speed, this is the input sent to the steering control module to effect a change in the steered wheel angle/angular velocity.

Steering feedback ($\omega_2$ or $\theta_2$), or Wheel_Angle: a measured value of the steered wheel angle/angular velocity, generated by the steering control module.

traction speed command signals: a value received from a sensor/actuator that the operator manipulates.

Trx_Speed_Cmd: a value generated by the traction application and is a transformation of the digitized voltage reading of the traction speed control input into units that reflect a speed.

Figure 5A:
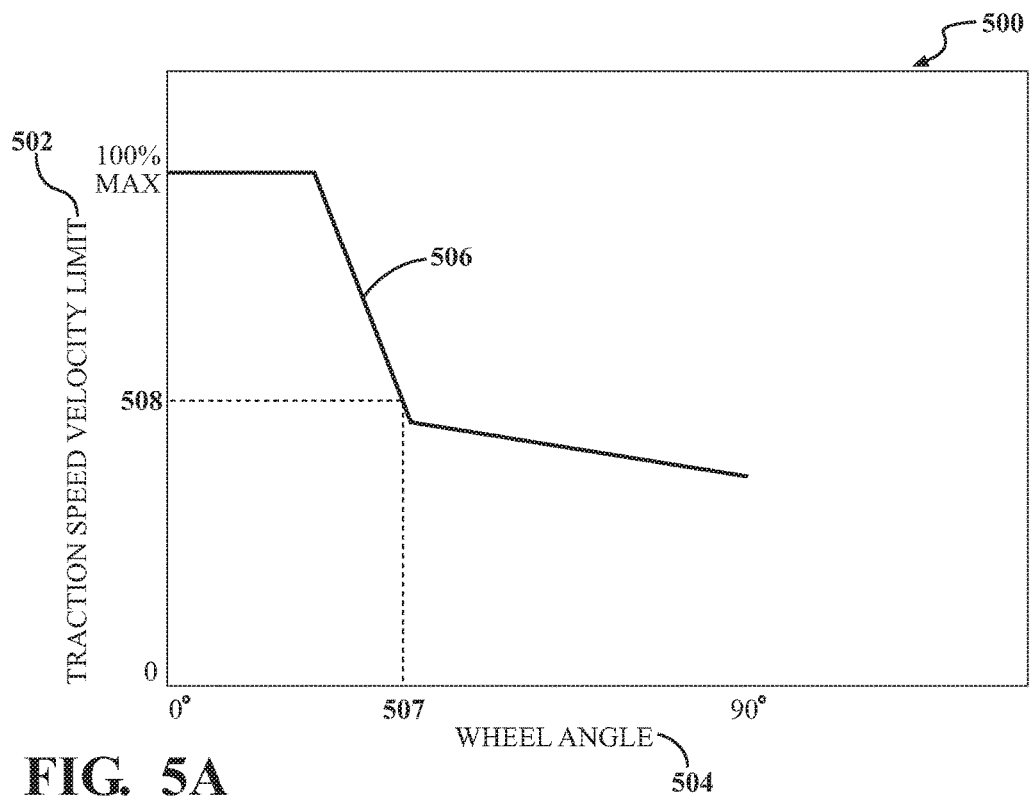
FIG. 5A-FIG. 5C illustrate different look up tables that can be used to calculate values for traction wheels and steered wheels in accordance with the principles of the present invention.

First Trx_Speed_Limit$_1$: a highest allowable traction wheel/motor speed for a particular wheel angle value, based on a desired wheel angle—to—traction speed relationship such as defined by the graph in FIG. 5A. The first Trx_Speed_Limit$_1$ is generated by the steering application and uses a Wheel_Angle_Cmd as a particular wheel angle value, see FIG. 5A. The first Trx_Speed_Limit$_1$ is used by the steering application to determine the initial Wheel_Angle_Target and the Wheel_Angle_Setpoint.

Second Trx_Speed_Limit$_2$: The second Trx_Speed_Limit$_2$ is generated by the traction application and uses an initial or modified Wheel_Angle_Target as the particular wheel angle value, see FIG. 5A. The second Trx_Speed_Limit$_2$ is used by the traction system to slow down the vehicle if necessary to stay within a desired Wheel Angle-to-Traction Speed relationship.

traction speed setting $\omega_4$: a value generated by the traction application, based on the operator's input, but modified based on the Trx_Speed_Limit$_2$; this velocity value will eventually be converted to a torque value by the traction application.

traction set point, $\tau_1$: a torque value based on the traction speed setting and the current speed of the vehicle, and is generated by the traction application.

Trx_Speed, or speed feedback, $\omega_3$: is a measured value of the traction wheel/motor speed, generated by the traction control module.

Figure 2B:
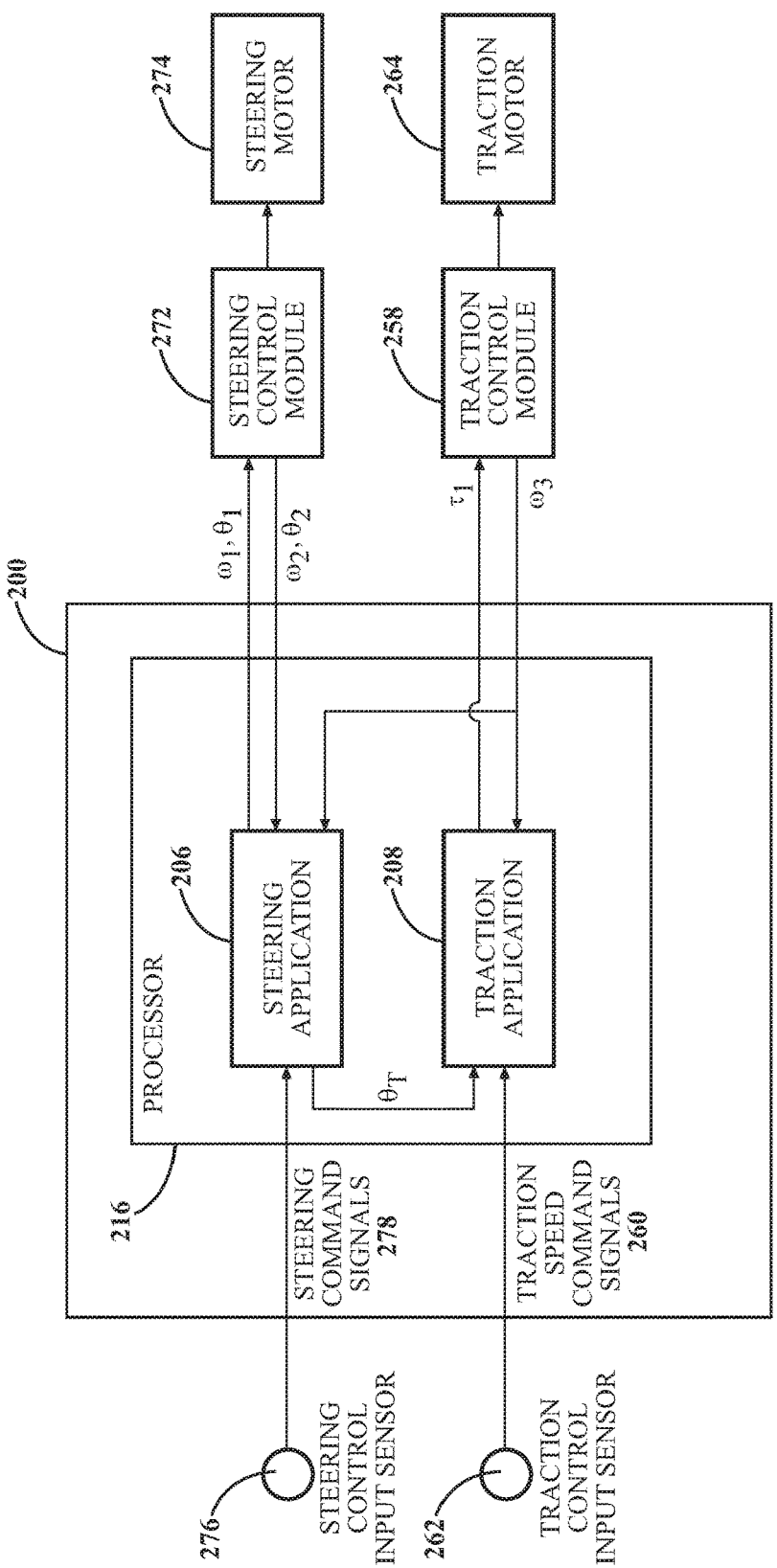
FIG. 2B schematically illustrates selected features of a vehicle and an example vehicle control module that are helpful in describing model-based diagnostic techniques that utilize a traction model in accordance with the principles of the present invention.

FIG. 2B schematically illustrates selected features of a vehicle 10 and an example vehicle control module 200 that are helpful in describing vehicle control operations that utilize a traction application and steering application. The other features of the vehicle 10 and the VCM 200 described with respect to FIG. 1 and FIG. 2A are omitted from FIG. 2B so as not to obscure aspects of the example control of vehicle operations described herein.

Referring to FIG. 2B, the VCM 200 includes a processor 216 illustrated to include the steering application 206, the traction application 208 and other applications (not shown) to be executed by the processor 216. In other example embodiments, the VCM 200 can include more than one microcontroller such as a master microcontroller and a slave microcontroller.

In FIG. 2B, an operator-controlled steering control input sensor 276 forming part of a steering device comprising the tiller knob 24 of the vehicle 10 set out in FIG. 1, provides sensor output signal values defining a steering command signal or signals 278 (e.g., an analog voltage) to the vehicle control module (VCM) 200. The steering control input sensor 276 may also form part of another steering device comprising a steering wheel, a control handle, a steering tiller or like steering element. The steering command signals 278 may be adjusted or otherwise conditioned and may, for example, be provided to an input pin of the processor 216 within the VCM 200. That signal may be further conditioned and supplied as an input value to the steering application 206 that is being executed by the processor 216. The voltage, for example, of the steering command signals 278, or the rate of change of that voltage, can vary based on the position and the rate of change of position of the steering control input sensor 276 associated with the steering device, i.e., the tiller knob 24 in the illustrated embodiment. Based on the input signal the steering application 206 receives that corresponds to the steering command signals 278, the steering application 206 determines a setpoint for a control attribute related to the steered wheel 20 of the vehicle. For example, a voltage value can be used along with a lookup table to correlate the voltage value to a particular wheel angle value for a steering setpoint or the rate of change of the voltage could be multiplied by a predetermined scaling factor to convert that rate of change into the setpoint that changes a steering motor angular velocity. Hence, the control attribute may, for example, be a steered wheel angle or an angular velocity of a steering motor 274 and, therefore, a value of the setpoint may be a steered wheel angle $\theta_1$ or a steering motor angular velocity $\omega_1$. The steering setpoint on $\omega_1$ or $\theta_1$ can be provided to a steering control module (SCM) 272. The SCM 272 uses the setpoint on $\omega_1$ or $\theta_1$ for controlling a steering motor 274 which positions the steered wheel 20 to conform to a desired position as indicated by the operator's manipulation of the steering control input sensor 276. The SCM 272 can also provide a feedback value $\theta_2$ or $\omega_2$ of the control attribute related to the steered wheel. In particular, the feedback value is a measured, or actual, steered wheel angle $\theta_2$ of the steered wheel 20 or is a measured, or actual, angular velocity $\omega_2$ of the steering motor 274. The SCM 272 can, for example, provide the feedback value $\theta_2$ or $\omega_2$ to the steering application 206.

The steering application 206 additionally produces the target steering angle $\theta_T$ or Wheel_Angle_Target which is provided to the traction application 208. As discussed below, with respect to FIGS. 4A-4B, a wheel angle/traction speed limiting process is performed by the steering application 206 and the traction application 208 wherein the steering application 206 determines both:

a) the steering setpoint, or Wheel_Angle_Setpoint, $\omega_1$ or $\theta_1$ and b) the target steering angle, or Wheel_Angle_Target, $\theta_T$.

As described in detail below, the target steering angle $\theta_T$ may have an initially calculated raw target steering angle $\phi_T$ that is subsequently modified, based on the operating characteristics of the vehicle, before being passed to the traction application. The target steering angle $\theta_T$ received at the traction application 208 from the steering application 206 serves as a limiting constraint that is converted by the traction application 208 to a traction control speed limit via a predetermined desired speed-to-wheel-angle relationship and is used in the determination of the desired traction speed setting $\omega_4$ and the traction torque setpoint $\tau_1$. The traction wheel speed, or a traction motor speed, can be considered a control attribute related to the traction wheel or driven wheel 20 of the vehicle 10, and the desired traction speed setting $\omega_4$, for either a traction motor 264 or the traction wheel 20, and the traction torque setpoint $\tau_1$, for the traction motor, can be considered to be respective setpoints for this control attribute related to the traction wheel.

The traction torque setpoint $\tau_1$ can be provided to a traction control module (TCM) 258. The TCM 258 uses the traction torque setpoint $\tau_1$ for controlling the operation of the traction motor 264 as discussed further below. The TCM 258 monitors the traction motor 264 and provides a traction feedback speed $\omega_3$ to the traction application 208 and the steering application 206. It may be beneficial in some embodiments to convert the traction speed, or speed feedback, $\omega_3$, to an actual linear speed of the vehicle 10 by the traction application 208. If, for example, the speed feedback $\omega_3$ was an angular speed of the traction motor 264, then the traction application 208 could scale that value to an actual linear speed, $v_3$, of the vehicle 10 based on a) a gearing ratio between the traction motor 264 and the driven wheel 20 and b) the circumference of the driven wheel 20. Alternatively, if the speed feedback $\omega_3$ was an angular speed of the driven wheel 20, then the traction application 208 could scale that value to an actual linear speed, $v_3$, of the vehicle 10 based on the circumference of the driven wheel 20. The linear speed of the vehicle equals the linear speed of the driven wheel 20, presuming there is no slip at the driven wheel.

The traction setpoint $\tau_1$ is determined by the traction application 208 using a Trx_Speed_Cmd which is generated by the traction application 208 and is based on traction speed command signals 260 received from an operator controlled traction speed control input sensor 262, such as the multi-function control handle 26 of the vehicle 10, and the target steering angle $\theta_T$ output from the steering application 206. The traction setpoint $\tau_1$ is output from the traction application 208 to the TCM 258 as a torque value which results in a corresponding speed of a traction motor 264 under the control of the TCM 258.

Figure 3A:
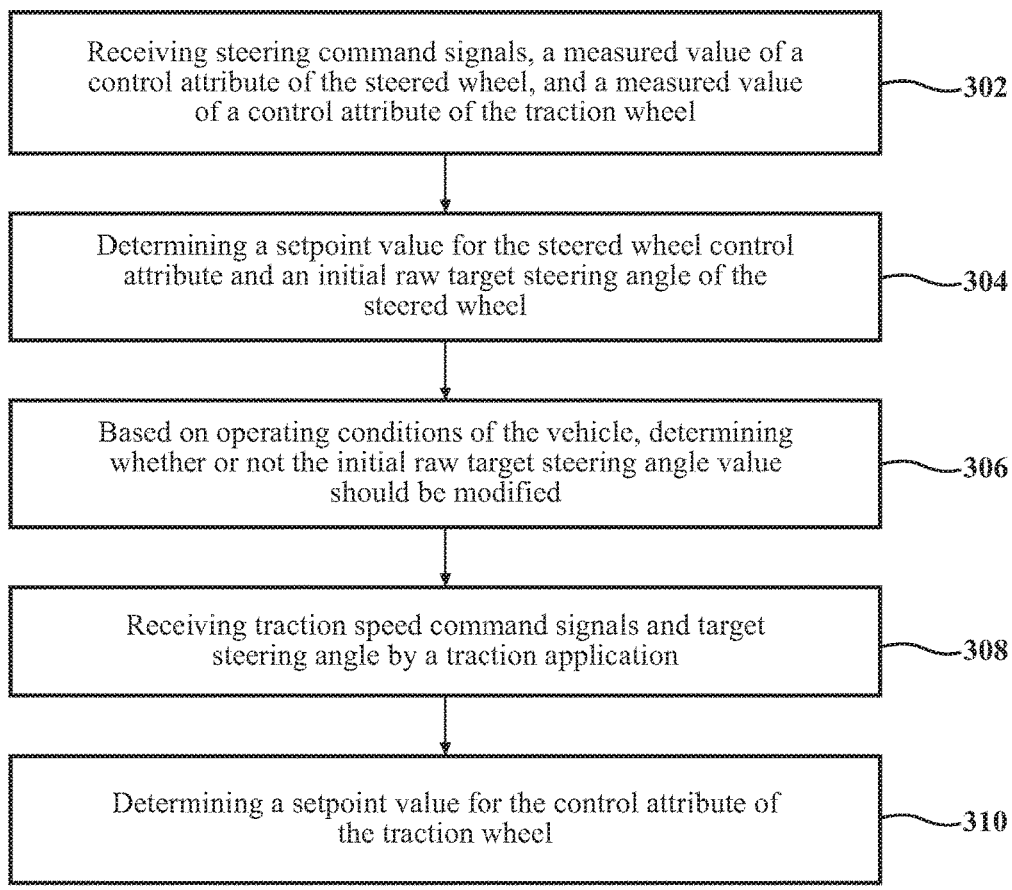

FIG. 3A depicts a flowchart of an example algorithm for performing steering application calculations and traction application calculations in accordance with the principles of the present invention.

In step 302, the steering application 206, which is executing on the processor 216 of the VCM 200, receives the steering command signals 278 to control the steered wheel 20 of the vehicle 10 and a measured, feedback value $\theta_2$, $\omega_2$ of a control attribute related to the steered wheel, such as a steered wheel angle or a steering motor angular velocity. The steering application 206 also receives a measured, feedback value $\omega_3$ of a control attribute related to a traction wheel 20 of the vehicle 10, such as a traction wheel speed or a traction motor speed.

Then, based on the steering command signals 278, the measured value $\theta_2$, $\omega_2$ of the control attribute related to the steered wheel and the measured value of the control attribute related to the traction wheel, the steering application determines, in step 304, a setpoint value $\theta_1$, $\omega_1$ of the control attribute related to the steered wheel, and a raw target steering angle $\phi_T$ of the steered wheel. The manner in which the raw target steering angle $\phi_T$ calculated is discussed below with regards to FIGS. 4A, 5A and 5B.

In step 306, the steering application 206, determines whether or not the initial value calculated for the raw target steering angle $\phi_T$ should be adjusted to a different value, based on the present operating conditions of the vehicle. As explained in detail below, the traction speed of a vehicle can be limited based on an angle of the steered wheel in order to control the forces applied to the operator so as to help maintain operator stability. During conditions in which the steered wheel angle remains relatively constant, the traction speed and wheel angle are such that a target acceleration can typically be achieved. However, during dynamic steering conditions (i.e. during steering wheel angle adjustments) the targets for allowable vehicle speeds and steered wheel angles may be more difficult to achieve because the steered wheel angle can be adjusted very quickly as compared to the adjustment of the speed of the vehicle. As a result, the traction system and the steering system can cause a) the untimely application of traction acceleration, b) traction slippage, and c) a less than desirable feel realized by the operator.

As discussed below with respect to FIG. 5A, Traction-Speed vs. Wheel-Angle restrictions permit faster vehicle speeds at smaller steered wheel angles, where the steered wheel angle is 0 degrees when the vehicle is travelling in a straight line in the illustrated embodiment and the steered wheel angle increases in magnitude as the vehicle moves at an increasing turning rate away from a straight line. As a result, the undesirable side-effects identified above that could potentially result during dynamic steering conditions tend to occur when the steered wheel angle is changing from a larger angle to a smaller angle. The potential for undesirable side-effects is compounded further when the steering motion quickly moves from one side extreme to the other side extreme as the vehicle will increase in speed as the steered wheel angle decreases and approaches 0 degrees and then the vehicle speed will decrease after the steered wheel angle moves through 0 degrees and increases in magnitude. Hence, the operator will very quickly be exposed to a speed increase as the steered wheel angle moves towards 0 degrees and a speed decrease as the steered wheel angle increases in magnitude from 0 degrees.

Thus, the steering application 206 can operate to further adjust the raw target steering angle $\phi_T$ of the steered wheel in order to limit the traction speed during the larger-to-smaller and some subsequent smaller-to-larger wheel angle adjustments as discussed further below. As an example, while the steered wheel angle is held relatively steady at a large, i.e., high magnitude, steered wheel angle value, the traction system control logic will achieve its defined speed. Upon receiving steering command signals that will result in returning the steered wheel angle to a wheel angle having an absolute value less than that of an initial large steered wheel angle (e.g., a change from a sharp turn condition to a straight-ahead travel condition) the steering application 206 can calculate a current value of the raw target steering angle $\phi_T$ of the steered wheel that is based on the smaller wheel angle. However, as discussed below with respect to FIG. 3B, the steering application 206 can, instead of using that current value of the raw target steering angle $\phi_T$, alternatively use a previously calculated value of the target steering angle $\theta_T$ (i.e., calculated based on the initial large steered wheel angle). Thus, even though the current value of the raw target steering angle $\phi_T$ is calculated to have a smaller absolute value, by providing the previously-calculated, larger value of the target steering angle $\theta_T$ to the traction application, the traction application will hold the traction speed limitation to the value realized at the initial large steered wheel angle until the wheel adjustment stops, or at least, drops below a motion threshold. Thus, an initial raw target steering angle $\phi_T$ calculated in step 304 may be provided to the traction application unchanged or may be modified, or adjusted, before being provided to the traction application as the target steering angle $\theta_T$.

In step 308, the traction application 208, which is executing on the processor 216 of the VCM 200, receives the measured speed feedback $\omega_3$ of the control attribute related to the traction wheel 20, the target steering angle $\theta_T$ from the steering application 206, and the traction speed command signals 260 to control the traction motor 264, which, in turn, controls the speed of the traction wheel 20 of the vehicle 10. Based on the traction speed command signals 260, the measured speed feedback $\omega_3$ of the control attribute related to the traction wheel, and the target steering angle $\theta_T$, the traction application 208 determines, in step 310, a setpoint value $\tau_1$ or $\omega_4$ of the control attribute related to the traction wheel 20.

Figure 3B:
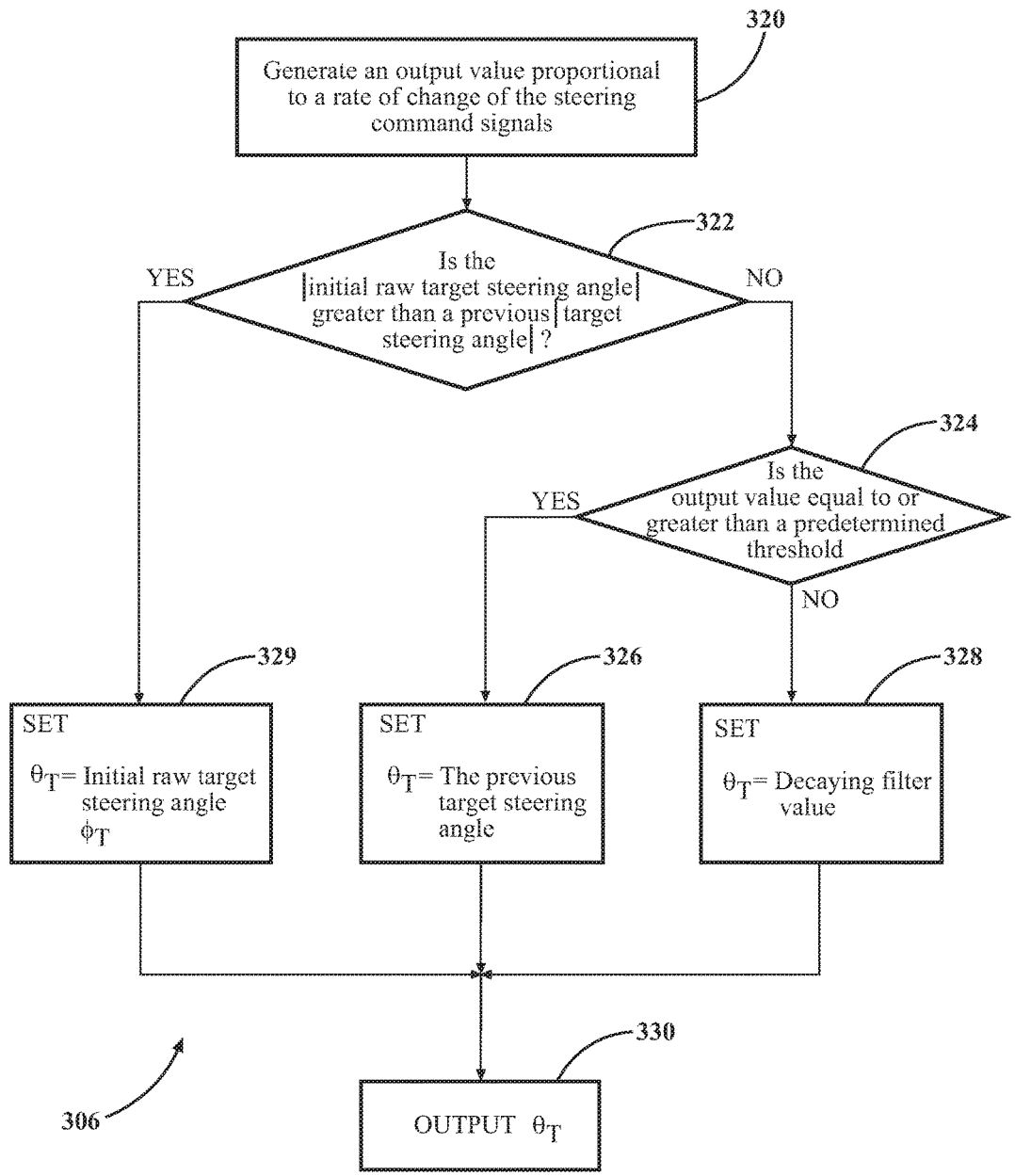

FIG. 3B is a flowchart of an example method for implementing the functionality described above with respect to step 306 of FIG. 3A. In particular, in step 320, the steering application 206 generates, or calculates, an output value y[t] that is indicative of and proportional to a rate of the change of the steering command signals 278, wherein each steering command signal comprises a voltage value in this illustrated embodiment. Details of generating this output value y[t] are described below with respect to FIG. 3C. In step 322, the steering application determines if the absolute value of the raw target steering angle $\phi_T$ calculated in step 304 is greater than an absolute value of a previously calculated target steering angle $\theta_T$. Referring to the last step of the flowchart of FIG. 3B, the output from the flowchart, in step 330, is the target steering angle $\theta_T$ (also referred to herein as the current target position value) for one iteration (i.e., the current iteration) through the flowchart of FIG. 3B. Thus, in the prior iteration of the flowchart there was also a target steering angle $\theta_T$ that was output which can be referred to as the previous target steering angle $\theta_T$. For a first iteration through the flowchart of FIG. 3B, the previous target steering angle $\theta_T$ is set equal to 0.

Figure 3C:
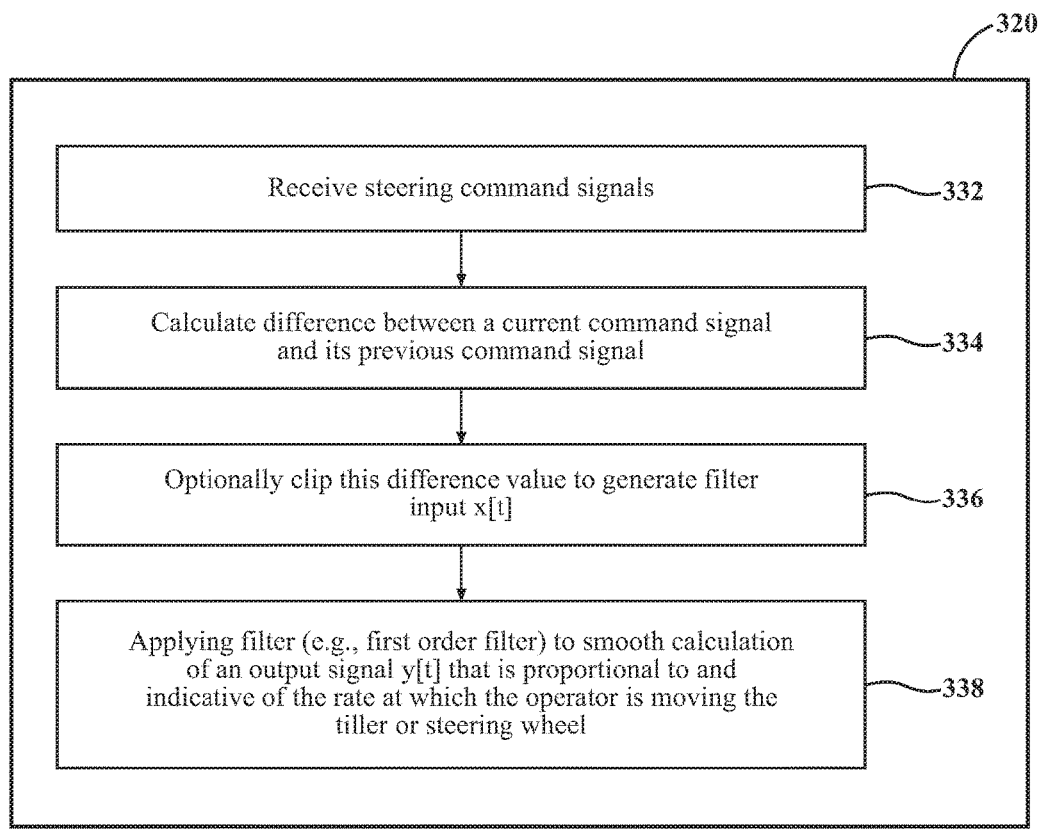
Figure 3D:
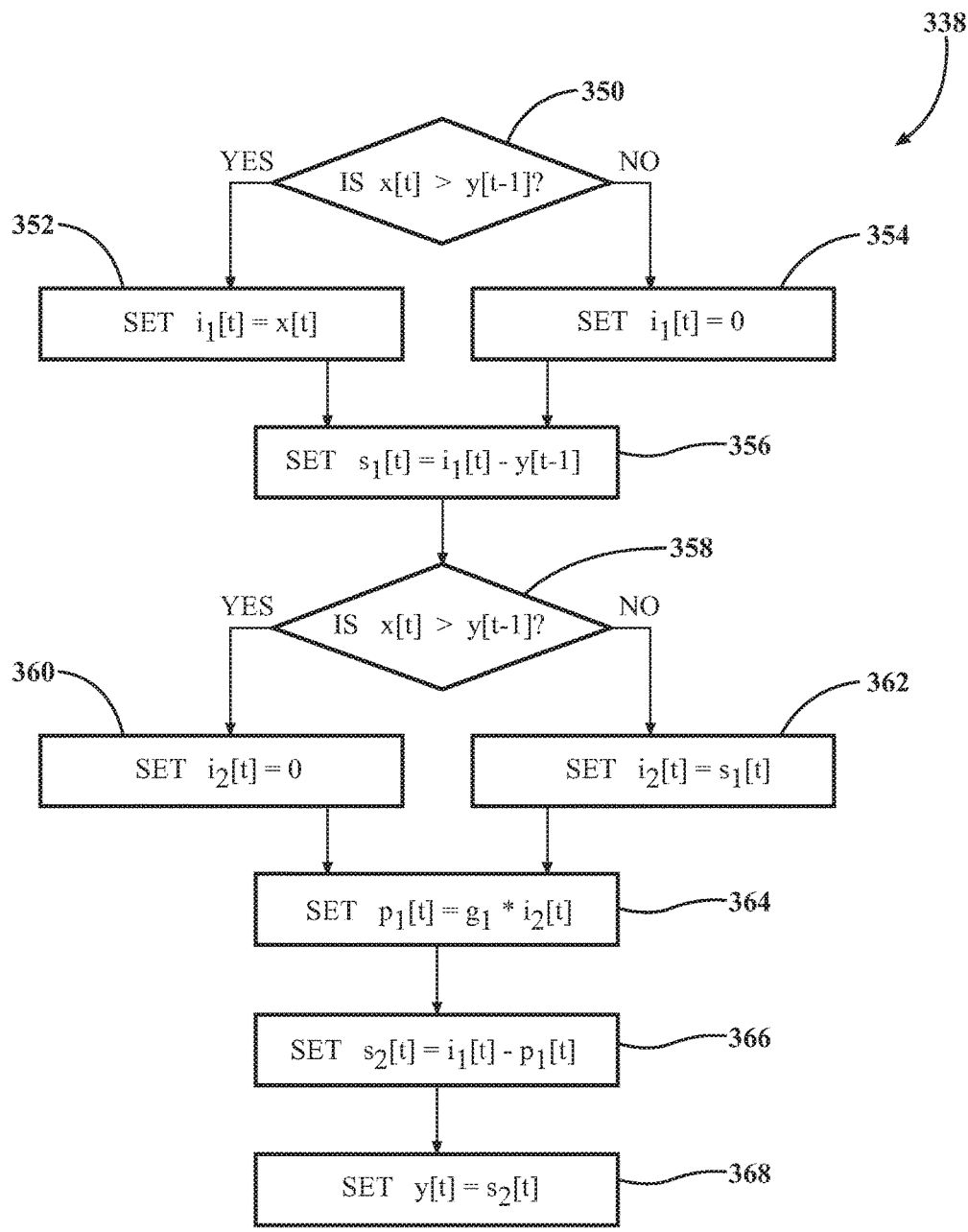
Figure 3E:
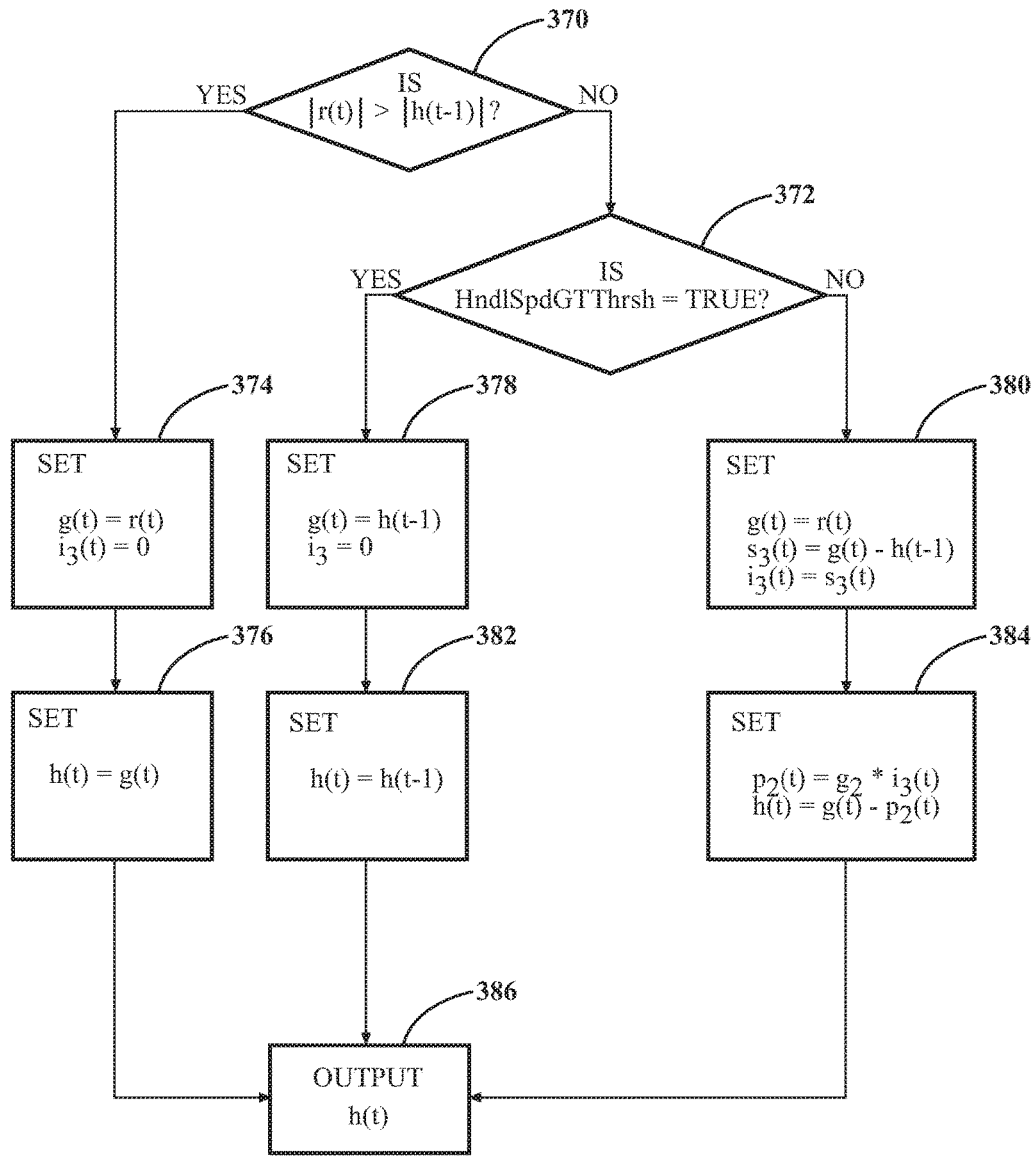

If the absolute value of the raw target steering angle $\phi_T$ calculated in step 304 is greater than an absolute value of a previously calculated target steering angle $\theta_T$, as shown in step 322 and also shown in step 370 of FIG. 3E, then control passes to step 329 and the target steering angle $\theta_T$ is set equal to the raw target steering angle $\phi_T$ calculated in step 304, via steps 374, 376, 386 of FIG. 3E. If the absolute value of the raw target steering angle $\phi_T$ is not greater than, i.e., equal to or less than, an absolute value of a previously calculated target steering angle $\theta_T$, then control passes to step 324, corresponding to step 372 of FIG. 3E. Thus, step 324 is reached when the steering command signals indicate that the operator is desiring the steered wheel angle to be equal to or decrease in magnitude such that an absolute value of a current value of the raw target steering angle $\phi_T$ is equal to or less than the absolute value of a previous target steering angle $\theta_T$. Hence, if a previous target steering angle $\theta_T$ is equal to +45 degrees, step 324 will be reached if a raw target steering angle $\phi_T$ is between +45 degrees and −45 degrees. In step 324, the steering application 206 determines whether the output value y[t] generated in step 320 is equal to or greater than a predetermined threshold. As noted above, the steering command signals 278 may, for example, relate to a voltage level output from the steering control input sensor 276 associated with the steering device. The rate of change of these signals, i.e., rate of change of voltage, could be measured in mV/s or a similar unit of measure. Thus, the output value y[t] which is proportional to the rate of change of the steering command signals would indicate that over a particular time period, the voltage level changed by a particular amount. Hence, the output value y[t] corresponds to a current speed at which the operator is moving or rotating the steering device. If that rate of change, as defined by the output value y[t], is equal to or greater than the predetermined threshold, then the operator is considered to be moving the steering device at a fast rate. The example predetermined threshold may have a value between about 0.01 to about 0.03 Volts/second, but other values may be used which are deemed appropriate by one skilled in the art.

If, in step 324, it is determined that the rate of change or current output value y[t] is equal to or greater than the predetermined threshold, then that indicates the operator is moving the steering control mechanism quickly and moving it in a way that will cause the absolute value of the steered wheel angle to decrease from its present absolute value. Under those vehicle operating conditions, the target steering angle $\theta_T$ is, in step 326, set equal to the previously calculated target steering angle, via steps 378, 382, 386 of FIG. 3E, that was calculated during the previous iteration of the flowchart of FIG. 3B.

If, in step 324 it is determined that the rate of change or current output value y[t] is not equal to or greater than the predetermined threshold, then that indicates the operator is moving the steering control mechanism relatively slowly and moving it in a way that will cause the steered wheel angle to decrease from its present value. Under those vehicle operating conditions, the target steering angle $\theta_T$ is, in step 328, calculated by a filter that generates a value that decays from the previously calculated target steering angle towards the raw target steering angle $\phi_T$. The details of this filter are described below with respect to FIG. 3E.

As mentioned above, the steering application 206 provides or outputs the target steering angle $\theta_T$ in step 330.

FIG. 3C is a flowchart of an example method for implementing the functionality described above with respect to step 320 of FIG. 3B. The steering application 206 receives the steering command signals 276 in step 332. As mentioned, these signals 276 can be a series of individual samples of a varying voltage that is produced by the steering control input sensor 278, wherein each voltage sample is considered a command signal. In step 334, a difference between a current command signal and a previous command signal is determined every predetermined time period, e.g., 10 milliseconds, so as to output a value that is indicative of and proportional to a rate of the change of the steering command signals 278. The difference between the two signals can be a positive value or a negative value depending on the motion or direction of the steering control mechanism. In step 336, the difference can optionally be clipped so that its magnitude does not exceed a predetermined amount. Also, an absolute value of the clipped difference can be calculated as well. Thus, in step 336 a current input value $x[t]$ is generated for a filter comprising in the illustrated embodiment the absolute value and the clipped difference between a current command signal and a previous command signal that is indicative of and proportional to a rate of the change of the steering command signals 278.

In step 338, the steering application applies a filter to the current input value $x[t]$ to smooth calculation of a filter output signal $y[t]$ that is proportional to, and indicative of, the rate at which the operator is moving the vehicle steering control mechanism. FIG. 3D is a flowchart of an example method for implementing the functionality described above with respect to step 338 of FIG. 3C.

Referring to FIG. 3D, the current input value $x[t]$ to the filter is compared to a previous output value $y[t-1]$ of the filter, in step 350. If $x[t]$ is greater than $y[t-1]$, then control passes to step 352 where a first intermediate value, $i_1[t]$, of the filter is set equal to the current input value $x[t]$. If the current input value $x[t]$ is less than or equal to previous output value $y[t-1]$, then control passes to step 354 where the first intermediate value $i_1[t]$ is set equal to 0.

In step 356, the filter calculates a first sum $s_1[t]$ that equals $(i_1[t]-y[t-1])$. In step 358, similar to step 350, the current input value $x[t]$ to the filter is compared to a previous output value $y[t-1]$ of the filter. If $x[t]$ is greater than $y[t-1]$, then control passes to step 360 where a second intermediate value, $i_2$, of the filter is set equal 0. If the current input value $x[t]$ is less than or equal to the previous output value $y[t-1]$, then control passes to step 362, where the second intermediate value $i_2[t]$ is set equal to the sum $s_1[t]$. In step 364, the filter calculates a product $p_1$ that equals the product of the second intermediate value $i_2[t]$ and a predetermined decay rate of the filter, $g_1$. The value for $g_1$ may be, for example, between 0.9 and 0.999 with the higher value representing a slower decay rate of the filter.

In step 366, the filter calculates a second sum $s_2[t]$ that equals $(i_1[t]-p_1)$. In step 368, the filter calculates the output value $y[t]$ which is equal to $s_2[t]$. As mentioned above, this output value $y[t]$ can be used to determine if the operator is moving the steering mechanism relatively fast by comparing the value $y[t]$ to a predetermined threshold.

Values from example filter calculations performed in accordance with FIG. 3D are set out in FIG. 3F, where the numerical values were not generated from actual steering command signals from a steering control input sensor 278 and are used only to illustrate the steps set out in FIG. 3D. In FIG. 3F, the first current input value $x[t]=1.5$ and is greater than the previous output value $y[t-1]=0.2$. Hence, in step 352, the first intermediate value $i_1[t]$ is set equal to the current input value $=1.5$. The first sum $s_1[t]$ is set equal to $i_1[t]$ minus the previous output value $y[t-1]$, such that the first sum $s_1[t]$ is equal to 1.3 in step 356. Since the current input value $x[t]$ is greater than the previous output value $y[t-1]$, the second intermediate value $i_2[t]$ is set equal to 0 in step 360, making product $p_1$ also zero, as calculated in step 364. The second sum $s_2[t]$ equals the first intermediate value $i_1$—product $p_1[t]$ in step 366 making the output $y[t]$ equal to $x[t]=1.5$.

The sixth input value $x[t]=3$, see FIG. 3F, and is less than the previous output value $y[t-1]=11$. Hence, control passes to step 354, where $i_1[t]=0$. In step 356, the first sum $s_1[t]=-11$. In step 364, presuming $g_1=0.9$, product $p_1[t]=-9.9$. In step 366, the second sum $s_2[t]=+9.9$. In step 368, the output $y[t]=9.9$.

Figure 3G:
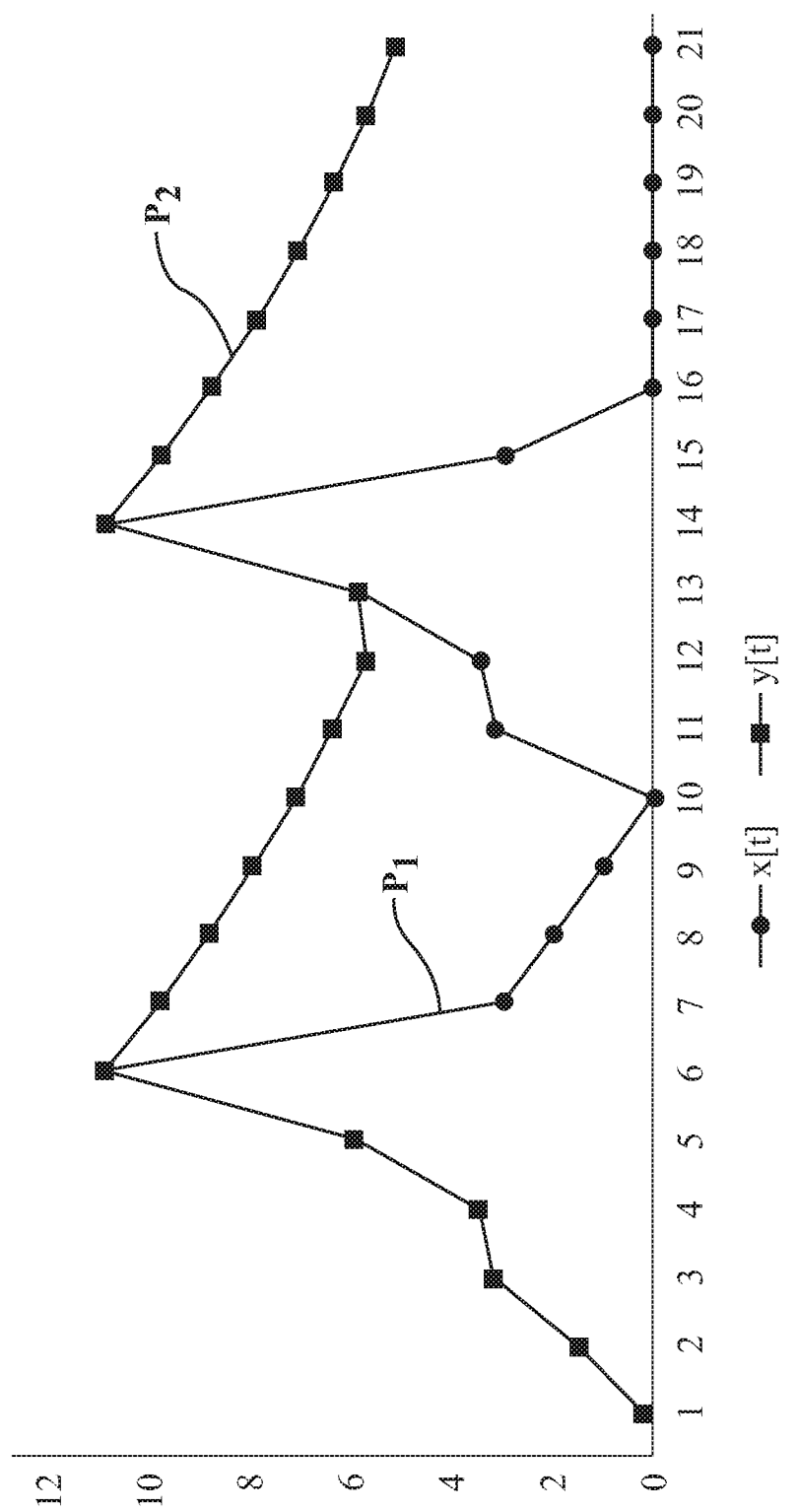

Plots $P_1$ and $P_2$ in FIG. 3G illustrate current input values $x[t]$ and current output values $y[t]$ from FIG. 3F. As can be seen from FIG. 3G, the output value $y[t]$ is equal to the current input value $x[t]$ when the current input value $x[t]$ is greater than the previous output value $y[t-1]$. When the current input values $x[t]$ are equal to or less than the corresponding previous output values $y[t-1]$, the corresponding current output values $y[t]$ are filtered such that they change more gradually and continuously and less abruptly than the input values $x[t]$. This is advantageous where, for example, an operator is moving the steering device very quickly such that corresponding output values $y[t]$ are greater than the threshold but, very briefly, the operator slows down rotation of the steering device before quickly increasing the speed of the steering device again. During the period when the operator slows down movement of the steering device, one or more input values $x[t]$ are less than corresponding prior output values $y[t-1]$. In this situation, if the current output values $y[t]$ are set equal to the current input values $x[t]$, then one or more of the current output values $y[t]$ may be below the threshold. When the speed of the steering device quickly increases, then the output values $y[t]$ may be above the threshold. The filter may prevent and smooth out such fluctuations of the output values $y[t]$ being above, dropping below and then going above the threshold value, such as in this scenario.

FIG. 3E is a flowchart of an example method for implementing the functionality described above with respect to steps 322-330 of FIG. 3B. The output $h(t)$ of FIG. 3E depends on the conditions of the raw target steering angle, the previous target steering angle, and the state of HndlSpdGTThrsh, wherein "HndlSpdGTThrsh" is a flag whose value is "TRUE" when the output value $y[t]$ calculated in step 338 of FIG. 3C is greater than or equal to a predetermined threshold and whose value is "FALSE" when the output value is less than the predetermined threshold.

The filter depicted in FIG. 3E receives an input signal or value $r[t]$ at time t that corresponds to the raw target steering angle $\phi_T$ and an intermediate value $g[t]$ is set equal to $r[t]$ when either:

a) the absolute value of the raw target steering angle is greater than the absolute value of the previous target steering angle corresponding to step 329 of FIG. 3B, or b) the absolute value of the raw target steering angle is equal to or less than the absolute value of the previous target steering angle and HndlSpdGTThrsh is FALSE, corresponding to step 328 of FIG. 3B.

Otherwise the intermediate value $g(t)$ is equal to the previous target steering angle, corresponding to step 326 of FIG. 3B. Thus, in the flowchart of FIG. 3E, block 370 is equivalent to block 322 of FIG. 3B, block 372 is equivalent to block 324 of FIG. 3B, blocks 374 and 376 are equivalent to block 329 of FIG. 3B, and blocks 378 and 382 are equivalent to block 326 of FIG. 3B.

In reaching step 328 of FIG. 3B (r(t)<=h(t−1) and Hndl-SpdGTThrsh =FALSE) a filter is applied to the intermediate value g(t), which equals input value r[t] in this example, such that it decays from h(t−1) to g(t). In step 380, the filter calculates a third sum $s_3[t]$ that equals (g[t]−h[t−1]). (This case is discussing r(t)<=h[t−1] and a further intermediate value $i_3[t]$ is set equal to $s_3[t]$).

In step 384, the filter calculates a product $p_2[t]$ that equals the product of $i_3[t]$ and a predetermined decay rate of the filter, $g_2$ (also referred to herein as "an adjustable multiplier coefficient"). The value for $g_2$ may be, for example, between 0.9 and 0.999 with the higher value representing a slower decay rate of the filter. In step 384, the filter calculates the output h[t] which is equal to (g[t]−$p_2$[t]) and this value h[t] is output in step 386. As mentioned above, this output value h[t] can be used as a current value for the target steering angle $\theta_T$.

Figures 3H, 3I:
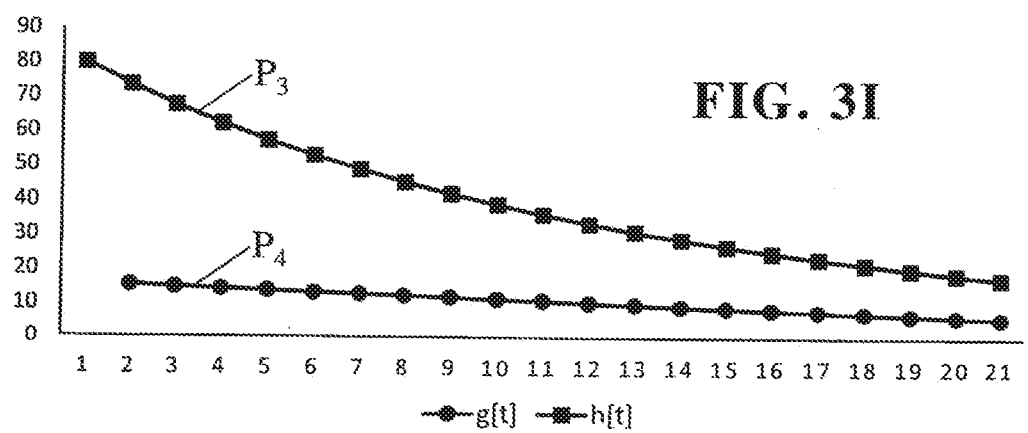

Values from example filter calculations performed in accordance with FIG. 3E are set out in FIG. 3H, where the numerical values are not actual target steering values and are used only to illustrate the steps set out in FIG. 3E. In FIG. 3H, a first raw target steering angle $\phi_T$ or current input value r[t] is equal to 15.5 and the previous target steering angle $\theta_T$ or previous output value h[t−1] is equal to 80. In step 380, the third sum $s_3[t]$ is calculated to equal to −64.5 after it has been determined that current input value r[t] is less than the previous output value h[t−1] in step 370, and HNDLSP-DGTThrsh =FALSE in step 372; hence, control passes to step 380, where intermediate value g[t] is set equal to r[t] and intermediate value $i_3$ is set equal to the third sum $s_3[t]$. Presuming decay rate $g_2$ is set equal to 0.9, the product $p_2[t]$, determined in step 384, is set equal to −58.05 and the filter calculates the output h[t] to equal 73.55.

Plots $P_3$ and $P_4$ in FIG. 3I illustrate current input values r[t] and calculated corresponding current output values h[t]. Under the particular conditions illustrated by FIGS. 3H and 3I, it is noted that each of the output values h[t] 2-20 equals a value that is closer to its corresponding raw target position value r[t] than the previous output value h[t−1]. It is also noted that as the current input value r[t] decreases, the corresponding current output value h[t] decreases as well but decays towards the input value r[t] at a slow generally continuous rate in this illustrated example. This is advantageous because the output h[t] is a target steering angle $\theta_T$ used to calculate a highest allowable traction wheel/motor speed, see FIG. 5A. If the target steering angle $\theta_T$ or output h[t] is allowed to match the input value r[t] without filtering, it may make for some abrupt movements of the vehicle. Hence, when the output value h[t] changes from its current value to its next value, the filter makes those transitions happen in a smooth or trend-like manner rather than sudden discontinuities.

As mentioned earlier, the steering application 206 and the traction application 208 operate in conjunction with one another to control a steered wheel angle and traction speed of the vehicle 10. The steering control input sensor 276 associated with a steering wheel or tiller knob can generate steering command signals 278 that vary according to an operator's manipulation of the apparatus. Each of these signals can then be converted to a digital value which can be scaled and adjusted to represent a value that has units appropriate for either a steered wheel angle (e.g., units of degrees) or an angular velocity of the steering motor (e.g., units of RPM). For instance, such a value can be referred to as a Wheel_Angle_Cmd and represents the operator's desired wheel position or steering motor angular velocity. One priority of a steering system comprising the steering control input sensor 276, the steering application 206, the SCM 272, the steering motor 274 and the steered wheel 20 is to position the steered wheel to the desired operator setting indicated by the Wheel_Angle_Cmd. Because the Wheel_Angle can be adjusted very quickly by the steering system, this rapid positional change may produce operator instability. Therefore, it is desirable that the steering application 206 produces control that will achieve the Wheel_Angle_Cmd as quickly as possible and without significant delay while also, in appropriate circumstances, reducing the traction speed so as to achieve a desired Wheel Angle-to-Traction Speed relationship (one example of which is depicted in FIG. 5A) to maintain operator stability. Using the Wheel_Angle_Cmd and a current Trx_Speed, the steering application 206 can determine two limiting constraints: a first Trx_Speed Limit$_1$ and a Wheel_Angle_Limit. Using these four values and the current Wheel_Angle, the steering application 206 determines the steering setpoint (Wheel_Angle_Setpoint) and the Wheel_Angle_Target. The Wheel_Angle_Setpoint is the value (i.e., $\omega_1$ or $\theta_1$) communicated to the SCM 272 for wheel angle position adjustment. The Wheel_Angle_Target is the target steering angle $\theta_T$ communicated to the traction application 208 for determination of the second Trx_Speed_Limit$_2$ value.

Figure 5B:
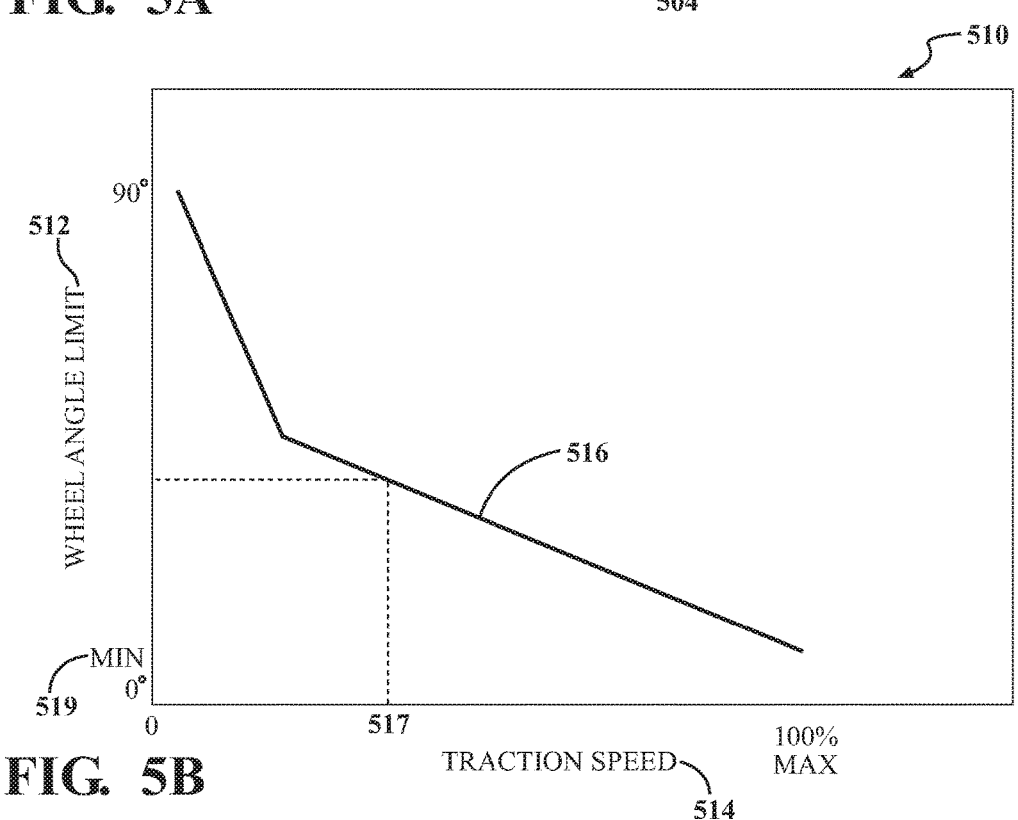

Even though the operator's input may result in a Wheel_Angle_Cmd indicating that the operator desires the steered wheel to have an angle x, the steering system can position the steered wheel per the operator command as quickly as possible without operator perceived delay, but in order to maintain operation within the defined Wheel Angle-to-Traction Speed relationship the steering application 206 of the VCM 200 may not immediately issue the new command x to the SCM 272 based on the traction wheel/motor speed feedback or Trx_Speed but rather apply a slight delay to the signal, x. For instance, while a vehicle is traveling relatively fast, there may be a reduced likelihood that a sharp steering change can produce operation within the defined Wheel Angle-to-Traction Speed relationship as compared to when the vehicle is traveling relatively slowly. Accordingly, a current measured value of the traction speed or Trx_Speed of the vehicle can be used to delay movement to commanded angle x so as to achieve operation within a desired Wheel Angle-to-Traction Speed relationship, such as shown in FIG. 5B.

Also, the Wheel_Angle_Target can be used by the traction application 208 to determine a maximum allowable traction speed at which the vehicle can be traveling at a wheel angle equal to the Wheel_Angle_Target so as to maintain a desired Wheel Angle-to-Traction Speed relationship, such as shown in FIG. 5A. This maximum allowable traction speed can be referred to as the second Trx_Speed Limit$_2$, traction wheel speed limit or the traction speed to which the vehicle shall be reduced while also adjusting the steered wheel angle to the Wheel_Angle_Cmd. Because of the quick response of the traction system to reduce the speed of the vehicle, the deceleration of the vehicle in conjunction with the delayed steering command achieve the operator desired steering adjustment without perceivable delay as mentioned above.

Figure 4A:
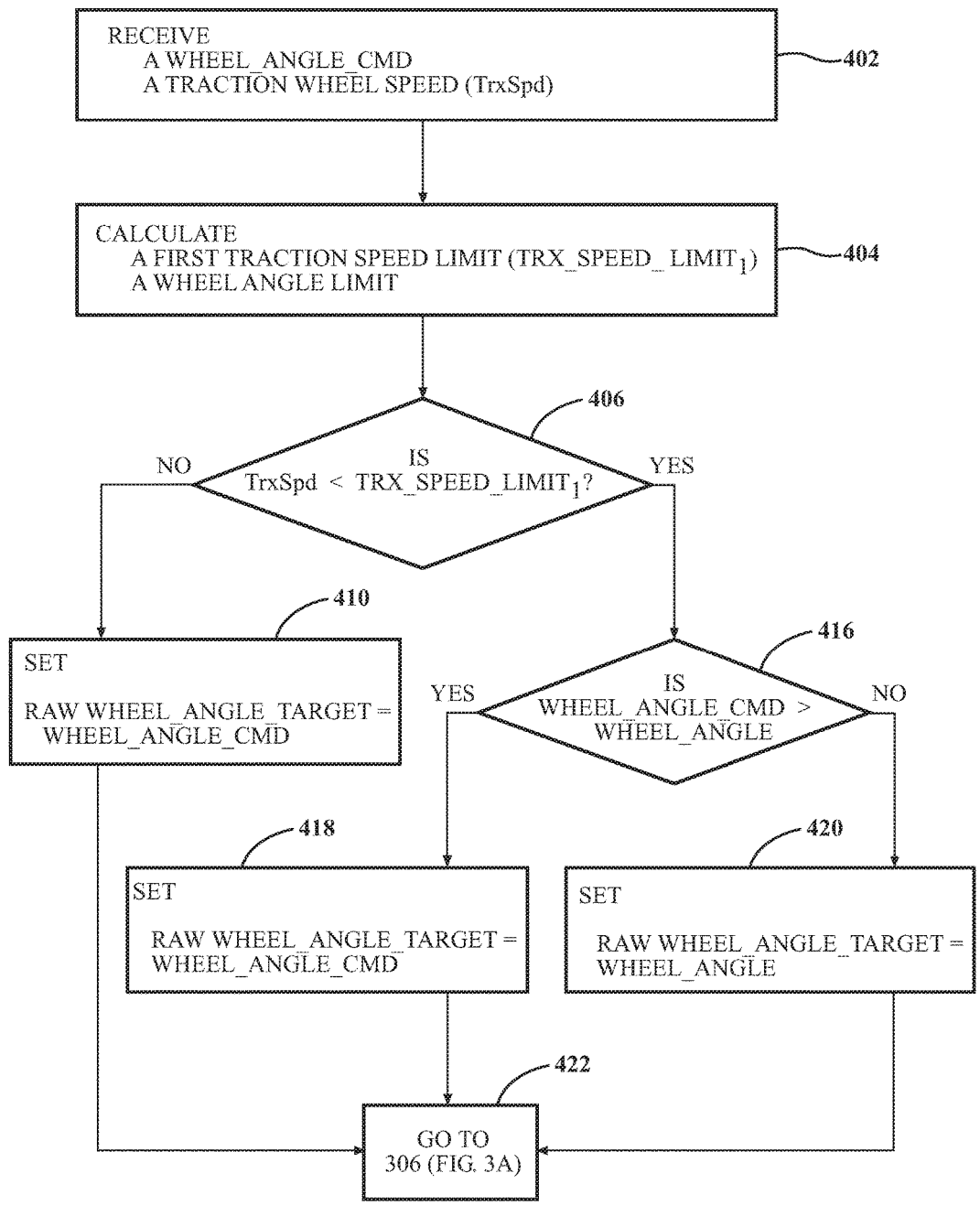
FIG. 4A-FIG. 4C illustrate a flowchart of an example control algorithm of a steering application and traction application in accordance with the principles of the present invention.
Figure 4B:
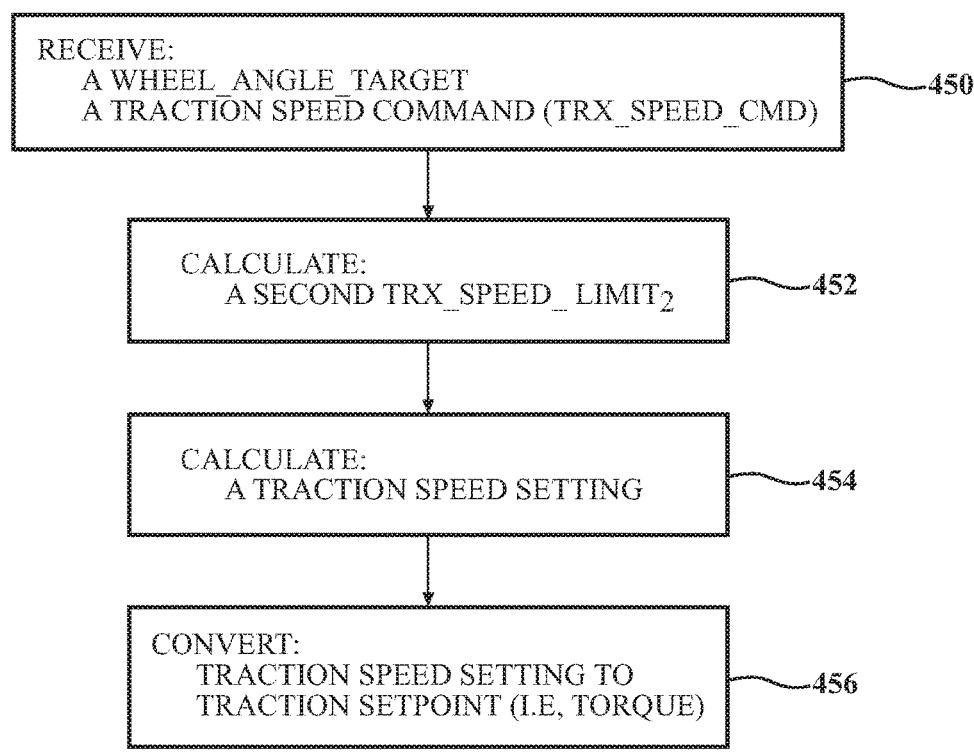

An example control algorithm, or process, for the steering application 206 of the VCM 200, is illustrated in FIG. 4A. The traction application 208 communicates with and works in conjunction with the steering application 206 to ensure that a Trx_Speed and a Wheel_Angle remain at a value that allows for safe control and stability defined by desired Wheel Angle-to-Traction Speed relationships, see FIGS. 5A and 5B. FIG. 4B illustrates an example algorithm of a portion of the traction application that generates a torque setpoint $\tau_1$ and/or a traction speed setting $\omega_4$.

In FIG. 4A, in step 402, a Wheel_Angle_Cmd and the traction motor speed feedback $\omega_3$, defining a measured traction wheel or motor speed (i.e., Trx_Speed), are received so that, in step 404, a first Trx_Speed_Limit$_1$ and Wheel_Angle_Limit can be calculated. A lookup table 500 constructed from a graph 506 in FIG. 5A in the illustrated embodiment can be used to determine a Trx_Speed_Limit$_1$ based on the Wheel_Angle_Cmd. In particular, the x-axis of the table 500 can refer to an absolute value of a wheel angle amount 504 that can be between 0 and 90 degrees, wherein 0 degrees corresponds to a wheel angle when the vehicle is traveling in a straight line. The y-axis of the table 500 corresponds to a velocity value 502 of the traction wheel or traction motor, i.e., the first Trx_Speed_Limit$_1$. The graph 506 in FIG. 5A depicts a Wheel Angle-to-Traction Speed relationship between a wheel angle value on the x-axis 504 and a maximum traction speed value or limit on the y-axis. The steering application 206 uses the Wheel_Angle_Cmd as the x-axis value 507 and locates the corresponding y-axis value 508 on the graph 506. The y-axis value 508 is determined to be the first Trx_Speed_Limit$_1$ for the steering application.

Referring to FIG. 5B, a lookup table 510 constructed from the graph in FIG. 5B in the illustrated embodiment can be used to determine a Wheel_Angle_Limit based on the Trx_Speed. In particular, the x-axis of the table 510 can refer to a measured velocity value 514 of the traction wheel or traction wheel motor, i.e., the Trx_Speed. The y-axis of the table 510 can refer to an absolute value of a wheel angle amount 512 that can be between 0 and 90 degrees, wherein 0 degrees corresponds to a wheel angle when the vehicle is traveling in a straight line. The graph 516 in FIG. 5B depicts a Wheel Angle-to-Traction Speed relationship between a maximum wheel angle value on the y-axis 512 and a traction speed value on the x-axis 514. The steering application 206 uses the Trx_Speed as the x-axis value 517 and locates the corresponding y-axis value 518 on the graph 516. The y-axis value 518 is determined to be the Wheel_Angle_Limit.

The steering application 206 can also receive the measured steered wheel angle $\theta_2$ of the steered wheel 20 or the measured angular velocity $\omega_2$ of the steering motor 274, i.e., a measured Wheel_Angle, that has a value indicative of the present angle of the vehicle's steered wheel or angular velocity of the steering motor. In step 406, a determination is made as to whether the vehicle's current traction speed, Trx_Speed, is less than the first Trx_Speed Limit$_1$. If it is not, then the traction speed of the vehicle is reduced by the traction application 208 while the steering application 206 adjusts the Wheel_Angle to equal the Wheel_Angle_Cmd with a slight delay based on the traction speed. As shown by block 410 of FIG. 4A, the control logic of the steering application 206 can set the raw wheel angle target to equal the Wheel_Angle_Cmd and continue at step 422 to go to step 306 of FIG. 3A and steps 320-330 of FIG. 3B to calculate the Wheel_Angle_Target.

FIG. 4B illustrates an example algorithm of how the traction application 208 can produce a traction setpoint such that, in appropriate circumstances, the vehicle's traction speed, Trx_Speed is reduced. Referring to FIG. 5A, the lookup table 500 can be used to determine a second Trx_Speed_Limit$_2$ based on the Wheel_Angle_Target in the same manner that the steering application 206 determines a Trx_Speed_Limit$_1$ based on the Wheel_Angle_Cmd. In this manner, the traction application 208 can be made aware of a future Wheel_Angle, i.e., the Wheel_Angle_Target, and adjust the traction speed simultaneously with the adjustment of the wheel angle to the Wheel_Angle_Command, i.e., the Wheel_Angle_Target. Returning to step 406, if the vehicle's traction speed, however, is below the first Trx_Speed_Limit$_1$, then the traction wheel or motor speed or the Trx_Speed requires no reduction to meet the Wheel Angle-to-Traction Speed relation, such as illustrated in FIG. 5A at a Wheel_Angle equal to Wheel_Angle_Cmd. Again, to maintain operator stability, the raw Wheel_Angle_Target is set equal to the larger of the Wheel_Angle_Cmd or the Wheel_Angle in steps 418 or 420, respectively, based on a comparison between the Wheel_Angle_Cmd and the Wheel_Angle performed in step 416. As noted above, the raw Wheel_Angle_target may be modified, or adjusted, under certain vehicle operating conditions. Thus, in step 422, control returns to step 306 (see FIG. 3A), which comprises steps 320-330 (see FIG. 3B), before another iteration of these steps just described can be performed and before the next value of the second Trx_Speed_Limit$_2$ is determined. The Wheel_Angle_Target used to determine the next value of the second Trx_Speed_Limit$_2$ will be the output target steering angle $\theta_T$ from step 330 in FIG. 3B.

According to an example algorithm depicted in FIG. 4B, the traction application 208 can calculate a traction speed setpoint $\omega_4$ or a traction torque setpoint $\tau_1$, such that, in appropriate circumstances, the traction wheel or motor speed, i.e., the Trx_Speed, of the vehicle 10 is reduced. The traction application receives, in step 450, a traction speed control input signal 260 received from the operator controlled traction speed control input sensor 262 so as to determine a traction speed command. The traction speed control input signal 260 may be adjusted or otherwise conditioned and may, for example, be provided to an input pin of the processor 216 within the VCM 200. That signal may be further conditioned and used by the traction application 208 that is being executed by the processor 216 to calculate the traction speed command, Trx_Speed_Cmd. As described above, the traction application 208 also receives the target steering angle $\theta_T$ or the Wheel_Angle_Target from step 330 in FIG. 3B as determined by the steering application 206. In step 452, a look-up table or similar model can be accessed to calculate a maximum traction speed or traction wheel speed limit (i.e., the second Trx_Speed_Limit$_2$) corresponding to a vehicle 10 being steered at the Wheel_Angle_Target from step 330 in FIG. 3B.

Referring back to FIG. 5A, the same lookup table 500 used by the steering application 206 to determine a first Trx_Speed_Limit$_1$ based on the Wheel_Angle_Cmd can be used by the traction application 208 to determine a second Trx_Speed_Limit$_2$ based on the Wheel_Angle_Target. In particular, the x-axis of the table 500 can refer to an absolute value of a wheel angle amount 504 that can be between 0 and 90 degrees, wherein 0 degrees corresponds to a wheel angle when the vehicle is traveling in a straight line. The y-axis of the table 500 corresponds to a velocity value 502 of the traction wheel or traction wheel motor. The graph 506 depicts a predetermined Wheel Angle-to-Traction Speed relation between a wheel angle value on the x-axis 504 and a maximum traction speed value on the y-axis. The traction application 208 uses the Wheel_Angle_Target as the x-axis value 507 and locates the corresponding y-axis value 508 on the graph 506. The y-axis value 508 is determined to be the second Trx_Speed_Limit$_2$ for the traction application 208.

As is apparent from FIG. 5A, Traction-Speed vs. Wheel-Angle restrictions permit faster vehicle speeds at smaller steered wheel angles. As noted above, undesirable side-effects could potentially result during dynamic steering conditions. The potential for undesirable side-effects is compounded further when the steering motion quickly moves from one side extreme to the other side extreme as a vehicle without the feature of step 306 may increase in speed as the steered wheel angle decreases and approaches 0 degrees and then the vehicle speed may decrease after the steered wheel angle moves through 0 degrees and increases in magnitude. Hence, the operator will very quickly be exposed to a speed increase as the steered wheel angle moves towards 0 degrees and a speed decrease as the steered wheel angle increases in magnitude from 0 degrees. This potential problem is believed to be avoided in accordance with the present invention where, in step 306, the steering application 206 determines whether or not the initial value calculated for each raw target steering angle $\phi_T$ should be adjusted to a different value, based on the present operating conditions of the vehicle. Thus, the steering application 206 can operate to further adjust the raw target steering angle $\phi_T$ of the steered wheel in order to limit the traction speed during the larger-to-smaller and some subsequent smaller-to-larger wheel angle adjustments, in accordance with step 306, which comprises steps 320-330.

As an example, upon receiving Wheel_Angle_Commands to cause the steered wheel angle to move quickly and continuously from +45 degrees to −46 degrees, the steering application 206 determines from step 410, 418 or 420 a corresponding initial raw target steering angle $\phi_T$ of the steered wheel for each command and inputs each value into step 306, which comprises steps 320-330. Presuming the absolute value of each initial raw target steering angle $\phi_T$ is less than or equal to an absolute value of a corresponding previous target steering angle $\theta_T$ for the Wheel_Angle_Commands of +44 degrees to −45 degrees and each output value y[t] generated in step 320 is greater than the predetermined threshold, the steering application 206 outputs from step 330 a target steering angle $\theta_T$=+45 degrees for each Wheel_Angle_Command of +44 degrees to −45 degrees. Thus, even though the Wheel_Angle_Commands vary from +44 degrees to −45 degrees, by providing the previously-calculated, larger target steering angle $\theta_T$ value =+45 degrees to the traction application, the traction application will hold the traction speed limitation, i.e., the second Trx_Speed_Limit$_2$, to the value realized at the +45 degree Wheel_Angle_Target until the absolute value of the raw target steering angle $\phi_T$ is greater than the absolute value of a corresponding previous target steering angle $\theta_T$, or the wheel adjustment stops, or at least, the output value y[t] generated in step 320 drops below the predetermined threshold. The absolute value of the raw target steering angle $\phi_T$ will be greater than the absolute value of the previous target steering angle $\theta_T$, which equals 45 degrees in this example, when the raw target steering angle $\phi_T$=−46 degrees.

The Trx_Speed_Cmd reflects a vehicle speed that the operator desires to reach. In step 454, the traction application 208 may use the second Trx_Speed_Limit$_2$ to reduce the Trx_Speed_Cmd in order to calculate an allowable Trx_Speed_Setting, $\omega_4$.

Figure 5C:
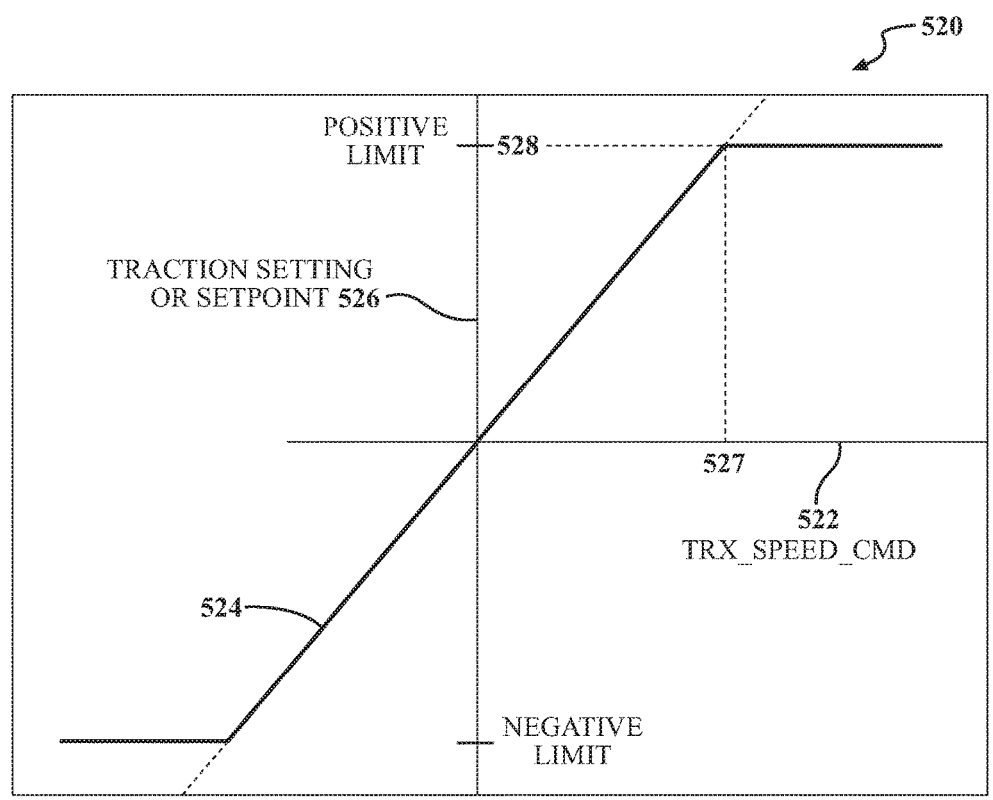

For example, a lookup table 520 constructed from a graph 524 in FIG. 5C in the illustrated embodiment can be used to limit a Trx_Speed_Cmd. Both the x-axis 522 and the y-axis 526 represent a speed value of either the traction wheel or the traction motor and the graph 524 defines a relationship between values on the x-axis and corresponding values on the y-axis. These speed values can be either positive or negative so a positive limit and a negative limit are shown in FIG. 5C; however, an example is described below that is based on only a positive traction speed value. The traction application uses the Trx_Speed_Cmd as the speed value, e.g., a value 527, for the x-axis 522 and locates the corresponding speed value, e.g., a value 528 corresponding to the value 527, on the y axis of the graph 724. This corresponding value 528 is output by the traction application 208 as the Trx_Speed_Setting, $\omega_4$. Presuming the graph 524 is a 45-degree line between 0 and the value 528, which equals the value of the current second Trx_Speed_Limit$_2$, then the speed value along the y-axis will equal the speed value along the x-axis in this range. However, once the speed value along the x-axis exceeds the speed value 527, which value 527 equals the speed value 528 and the current second Trx_Speed_Limit$_2$, the graph 524 has a y-value limited to the value 528, which again equals the current value of the second Trx_Speed_Limit$_2$. Accordingly, if the traction application 208 sets the speed value 528, i.e., the maximum value of the graph 524 in the y direction, to equal the current second Trx_Speed_Limit$_2$, then the Trx_Speed_Cmd received by the traction application will not result in a Trx_Speed_Setting, $\omega_4$ that exceeds the second Trx_Speed_Limit$_2$.

When the Trx_Speed is equal to or greater than the first Trx_Speed_Limit$_1$ in step 406 in FIG. 4A, the raw Wheel_Angle_Target is set equal to the Wheel_Angle_Cmd. As mentioned above, this raw Wheel_Angle_Target, under certain vehicle operating conditions, can be modified, in step 306, before being provided as the Wheel_Angle_Target to the traction application. The traction application 208 uses the Wheel_Angle_Target from step 330 in FIG. 3B to determine a second Trx_Speed_Limit$_2$. The traction application 208 then uses the Trx_Speed_Cmd as an input into the lookup table 520 based on the graph 524 in FIG. 5C and receives an output. Presuming the Trx_Speed is generally equal to the Trx_Speed_Cmd and since the Trx_Speed is greater than the first Trx_Speed_Limit$_1$, the output from the lookup table 520 typically equals the second Trx_Speed_Limit$_2$. Hence, the traction application 208 outputs as the Trx_Speed_Setting, $\omega_4$ the second Trx_Speed_Limit$_2$. The TCM 258 then quickly reduces the traction wheel or motor speed, i.e., the Trx_Speed, to the second Trx_Speed_Limit$_2$.

The traction setpoint may be a traction speed setpoint $\omega_4$ defined by the Trx_Speed_Setting $\omega_4$, or the traction setpoint may be a traction torque setpoint $\tau_1$ that can be calculated based on the Trx_Speed_Setting and a current Trx_Speed of the vehicle. As one example and as known to those skilled in the prior art, a proportional-integral-derivative (PID) controller can be used that receives, as an input, a difference value between the Trx_Speed_Setting and the Trx_Speed and calculates, as output, the torque setpoint $\tau_1$. Thus, in step 456, the traction application 208 calculates the traction setpoint $\tau_1$ which the TCM 258 will use to control operation of the traction motor 264. The traction setpoint $\tau_1$ is calculated so as to control the traction motor speed, e.g., to reduce the Trx_Speed of the vehicle when the Trx_Speed is equal to or greater than the first Trx_Speed_Limit$_1$ in step 406 in FIG. 4A, to arrive at the Trx_Speed_Limit$_2$ while the Wheel_Angle is also being adjusted to arrive at the Wheel_Angle_Target.

Figure 4C:
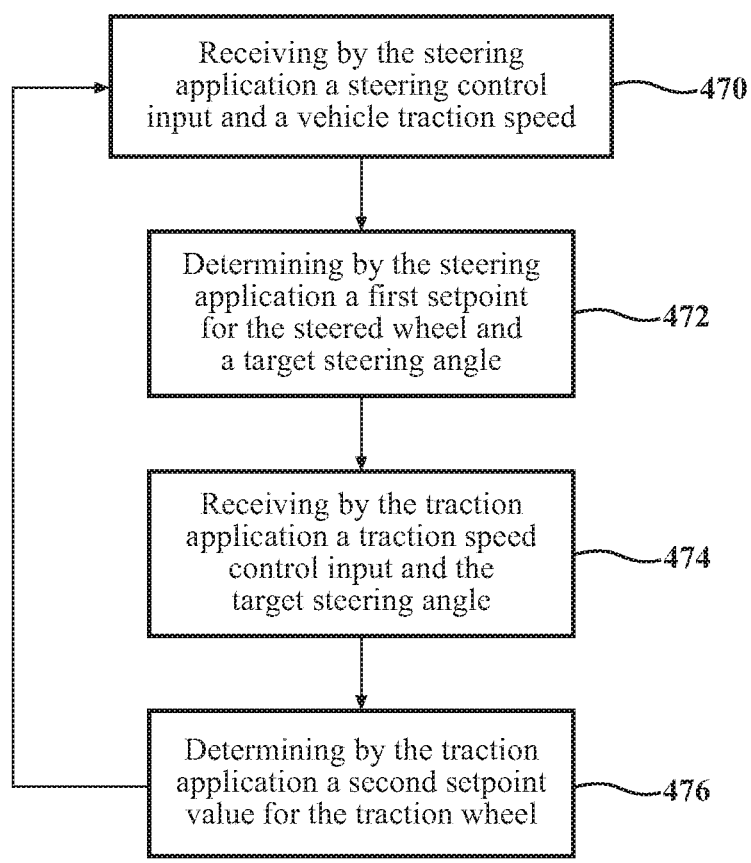

FIGS. 3A-3E and 4A relate to operation of the steering application 206 and FIG. 4B relates to operation of the traction application 208. FIG. 4C is a flowchart of a conceptual view of how both the steering application 206 and the traction application 208 operate together. In step 470, the steering application receives the steering control input and a present value of the vehicle's traction speed $\omega_3$, Trx_Speed. As mentioned above, the steering application can then determine in step 472 a first setpoint for the steered wheel (i.e., steering setpoint $\omega_1$ or $\theta_1$). The steering control module 272 can then control the steering motor 274 based on this first setpoint to effect a change in an actual angle of the steered wheel.

In step 472, the steering application also determines a value of the target steering angle $\theta_T$. This angle can then be modified as described above under the prescribed conditions. Independent of the logical flow of the steering application, the traction application executes in order to determine a second, traction setpoint (i.e., $\tau_1$ or $\omega_4$). In particular, in step 474, the traction application receives the target steering angle $\theta_T$ (i.e., Wheel_Angle_Target) and traction speed command signals as input. In step 476, the traction application uses the Wheel_Angle_Target or target steering angle $\theta_T$ and the graph of FIG. 5A to determine the second Trx_Speed_Limit$_2$ which, as described above, can be used to limit a value of the traction setpoint (i.e., $\tau_1$ or $\omega_4$) generated by the traction application. The traction control module (TCM) 258 can then control the traction motor 264 based on this second setpoint to effect a change in an actual speed of the traction wheel.

Thus, respective processors, or computing circuitry, of the VCM 200 and the TCM 258 communicate with one another to cooperatively calculate a current target angle value $\theta_T$, a traction wheel speed limit (second Trx_Speed_Limit$_2$), and a traction setpoint $\tau_1$ in order to control the traction motor 264 of the materials handling vehicle 10 using the traction setpoint $\tau_1$.

The logical flow of the flowchart of FIG. 4C returns from step 476 to step 470 in order to repeatedly iterate through the steps, such that in each successive iteration through the four steps 470-476, updated values for the vehicle traction speed $\omega_3$ and, thus, the target steering angle $\theta_T$ are utilized. In this manner, when the Trx_Speed is equal to or greater than the first Trx_Speed_Limit$_1$ in step 406 in FIG. 4A, the steering application and the traction application cooperate to reduce the Trx_Speed, $\omega_3$, of the vehicle to arrive at the Trx_Speed_Limit$_2$ while the Wheel_Angle, $\omega_2$ or $\theta_2$, is also being adjusted based on the traction speed to arrive at the Wheel_Angle_Cmd.

Additionally, the flowcharts of FIGS. 4A and 4B discussed above involve a number of quantities related to a steered wheel angle: Wheel_Angle_Target, Wheel_Angle_Cmd, Wheel_Angle_Limit, Wheel_Angle_Setpoint, and Wheel_Angle. When these quantities are measured (or calculated) using the frame of reference shown in FIGS. 6A and 6B, then the absolute value of that quantity can be used in the comparative steps of FIGS. 4A and 4B to provide the appropriate logical flow control. The measured value of the steered wheel is in the range of −180 to +180 degrees. In order to use the look-up-tables and perform other comparative steps, both the steering and traction applications convert the wheel angle to a value between −90 and +90 degrees. For measured wheel angles between −90 and +90 degrees, both applications take the absolute value of the measured wheel angle. For measured wheel angles between 90 and 180 degrees or −90 and −180 degrees, both applications take the absolute value of the measured wheel angle and convert and subtract it from 180 degrees. In this manner, angles between 90 and 180 degrees are converted to angles between 90 and 0 degrees.

Figure 7A:
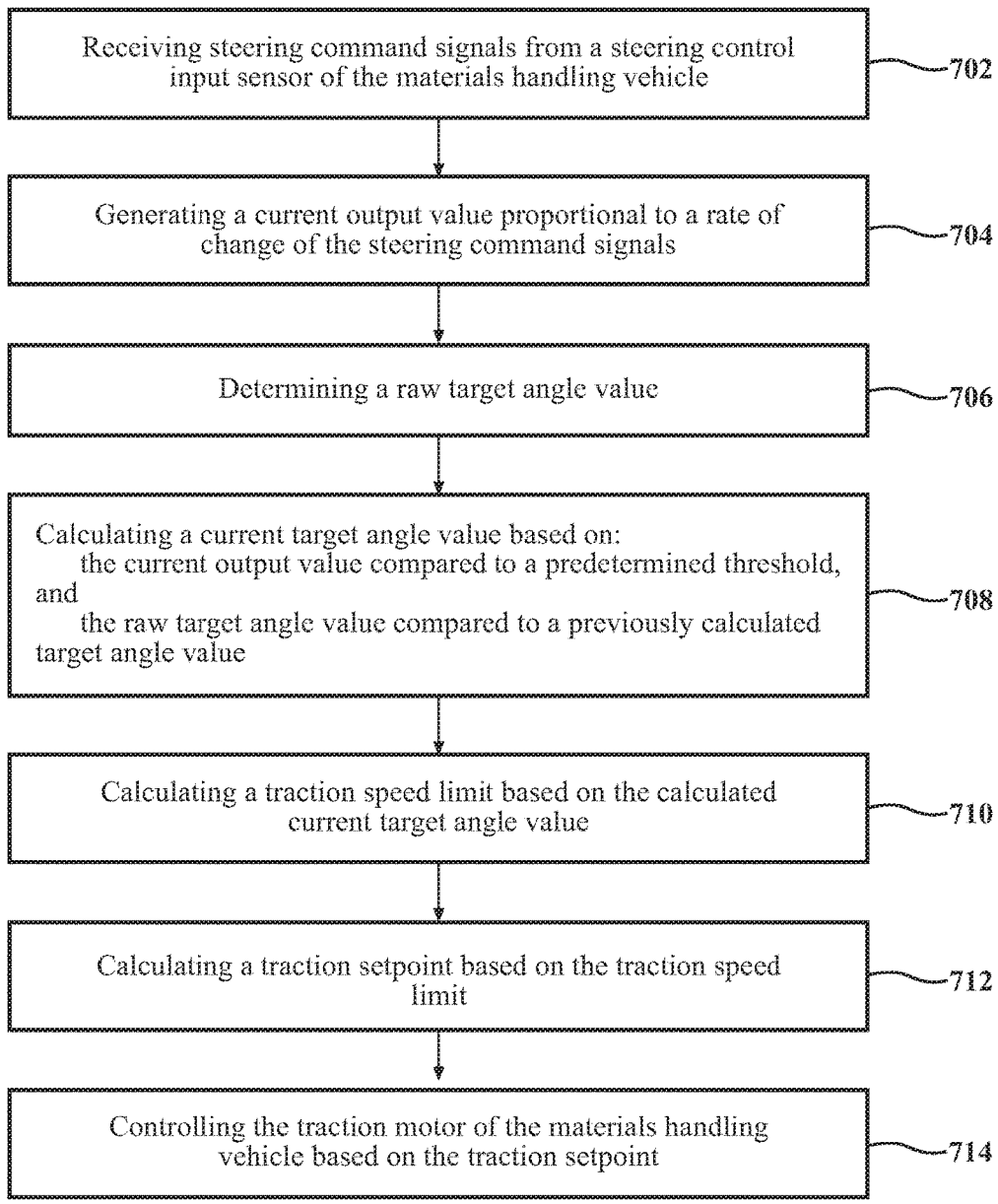
FIGS. 7A and 7B each illustrate a respective flowchart of example processes that can be performed to control a traction motor or traction wheel of a materials handling vehicle in accordance with the principles of the present disclosure.
Figure 7B:
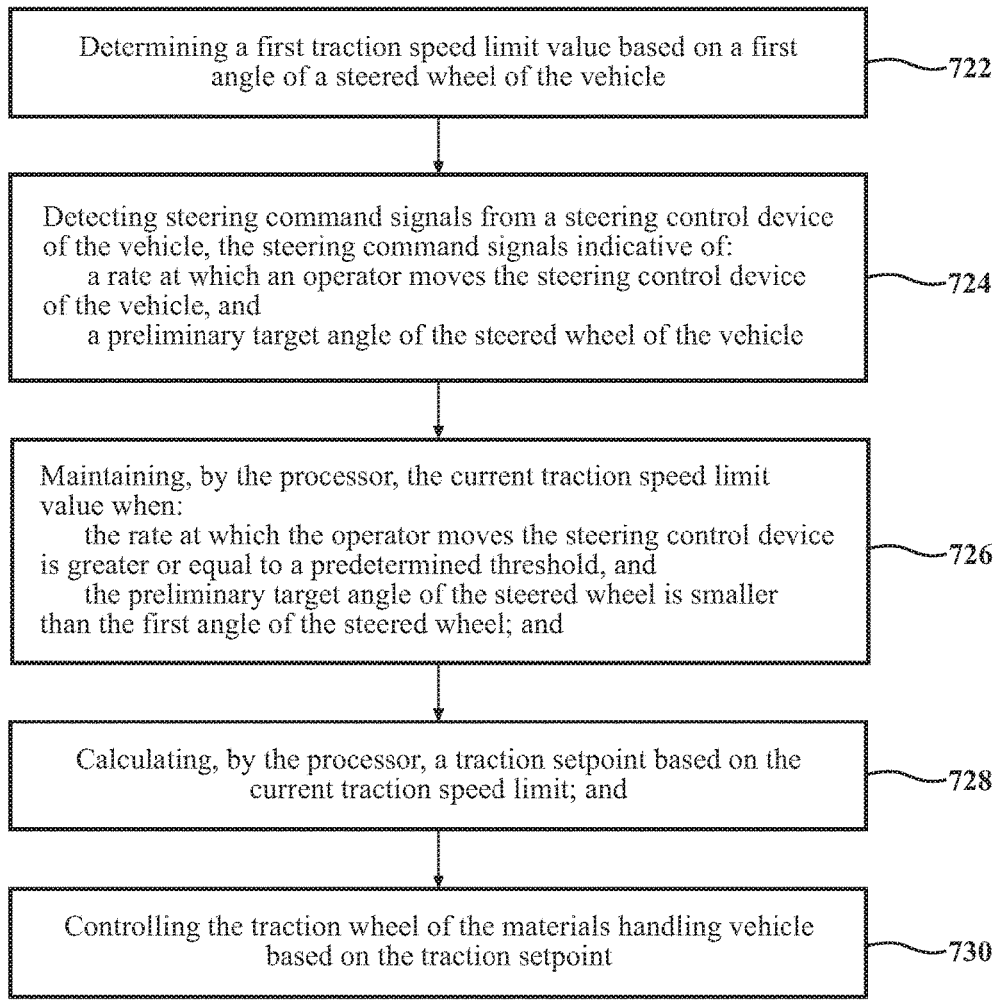

FIGS. 7A and 7B each illustrate a respective flowchart of example processes that can be performed to control a traction motor or traction wheel of a materials handling vehicle in accordance with the principles of the present disclosure. As described above, each of these processes can also be implemented in a system that includes, for example, a processor executing program code stored in a memory, a steering control input sensor or steering control device, and a traction controller that controls the traction motor or traction wheel.

The flowchart of FIG. 7A begins in step 702 with receiving, for example by a processor, steering command signals from a steering control input sensor of a materials handling vehicle and then, in step 704, generating a current output value proportional to a rate of change of the steering command signals. The process continues in step 706 with determining a raw target steering angle value and, in step 708, calculating a current target steering angle value based on both:

a) the current output value compared to a predetermined threshold, and b) the raw target steering angle value compared to a previously calculated target steering angle value. In step 710, a traction speed limit is calculated based on the calculated current target steering angle value from step 708 and, in step 712, a traction setpoint is calculated based on the traction speed limit. The last step of the flowchart of FIG. 7A ends, in step 714, with controlling the traction motor of the materials handling vehicle based on the traction setpoint.

The flowchart of FIG. 7B begins in step 722 with determining, for example by a processor, a first traction speed limit value based on a first angle of a steered wheel of the vehicle and then, in step 724, detecting steering command signals from a steering control device of the vehicle. In particular, the steering command signals are indicative of a rate at which an operator moves the steering control device of the vehicle, and a preliminary target angle of the steered wheel of the vehicle. The process continues in step 726 with maintaining the current traction speed limit value when:

a) the rate at which the operator moves the steering control device is greater or equal to a predetermined threshold, and b) the preliminary target steering angle of the steered wheel is equal to or smaller than the first angle of the steered wheel. In step 728 a traction setpoint is calculated based on the current traction speed limit and the process of FIG. 7B ends in step 730 with controlling the traction wheel of the materials handling vehicle based on the traction setpoint.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A computer-implemented method for controlling a traction motor of a materials handling vehicle, the method comprising:

receiving, by a processor, steering command signals from a steering control input sensor of the materials handling vehicle;

generating, by the processor, a current output value proportional to a rate of change of the steering command signals;

determining, by the processor, a raw target steering angle value;

calculating, by the processor, a current target steering angle value based on:
the current output value compared to a predetermined threshold, and
the raw target steering angle value compared to a previously calculated target steering angle value;
calculating, by the processor, a traction speed limit based on the calculated current target steering angle value;
calculating, by the processor, a traction setpoint based on the traction speed limit; and
controlling the traction motor of the materials handling vehicle based on the traction setpoint.

2. The method of claim 1, wherein the calculated current target steering angle value equals the raw target steering angle value when the raw target steering angle value is greater than the previously calculated target steering angle value.

3. The method of claim 1, wherein the calculated current target steering angle value equals the previously calculated target steering angle value when:
the current output value is greater than or equal to the predetermined threshold; and
the raw target steering angle value is less than or equal to the previously calculated target steering angle value.

4. The method of claim 1, wherein the calculated current target steering angle value equals a value that is closer to the raw target steering angle value than the previously calculated target steering angle value when:
the current output value is less than the predetermined threshold; and
the raw target steering angle value is less than or equal to the previously calculated target steering angle value.

5. The method of claim 4, wherein the calculated current target steering angle value is calculated by applying a smoothing filter function to the raw target steering angle value.

6. The method of claim 5, wherein the smoothing filter function comprises an adjustable multiplier coefficient.

7. The method of claim 1, wherein generating the current output value proportional to the rate of change of the steering command signals comprises:
calculating, by the processor, a current input value proportional to the rate of change of the steering command signals;
comparing the current input value to a previous output value;
if the current input value is equal to or less than the previous output value, calculating by the processor the current output value by multiplying the previous output value by a predetermined decay rate of a filter; and
if the input value is greater than the previous output value, setting the current output value equal to the current input value.

8. The method of claim 1, comprising: determining, by the processor, whether the current output value is greater than or equal to the predetermined threshold.

9. The method of claim 8, wherein the current target steering angle value is calculated based on:
whether the current output value is greater than or equal to the predetermined threshold, and
whether the raw target steering angle value is less than or equal to the previously calculated target steering angle value.

10. The method of claim 1, wherein controlling the traction motor comprises controlling at least one of a speed of the traction motor or a torque of the traction motor.

11. A system for controlling a traction motor of a materials handling vehicle, the system comprising:
a steering control input sensor of the materials handling vehicle;
a processor coupled to memory, wherein the memory stores program code that is executed by the processor to:
receive steering command signals from the steering control input sensor of the materials handling vehicle;
generate a current output value proportional to a rate of change of the steering command signals;
determine a raw target steering angle value;
calculate a current target steering angle value based on:
the current output value compared to a predetermined threshold, and
the raw target steering angle value compared to a previously calculated target steering angle value;
calculate a traction speed limit based on the calculated current target steering angle value; and
calculate a traction setpoint based on the traction speed limit; and
a traction controller that controls the traction motor of the materials handling vehicle based on the traction setpoint.

12. The system of claim 11, wherein the calculated current target steering angle value equals the raw target steering angle value when the raw target steering angle value is greater than the previously calculated target steering angle value.

13. The system of claim 11, wherein the calculated current target steering angle value equals the previously calculated target steering angle value when:
the current output value is greater than or equal to the predetermined threshold; and
the raw target steering angle value is less than or equal to the previously calculated target steering angle value.

14. The system of claim 11, wherein the calculated current target steering angle value equals a value that is closer to the raw target steering angle value than the previously calculated target steering angle value when:
the current output value is less than the predetermined threshold; and
the raw target steering angle value is less than or equal to the previously calculated target steering angle value.

15. The system of claim 14, wherein the calculated current target steering angle value is calculated by applying a smoothing filter function to the raw target steering angle value.

16. The system of claim 15, wherein the smoothing filter function comprises an adjustable multiplier coefficient.

17. The system of claim 11, wherein the processor when executing the program code to generate the current output value proportional to the rate of change of the steering command signals:
calculates a current input value proportional to the rate of change of the steering command signals;
compares the current input value to a previous output value; and
if the current input value is equal to or less than the previous output value, calculates the current output value by multiplying the previous output value by a predetermined decay rate of a filter; and
if the input value is greater than the previous output value, sets the current output value equal to the current input value.

18. The system of claim 11, wherein the memory stores program code that is executed by the processor to:
  determine whether the current output value is greater than or equal to the predetermined threshold.

19. The system of claim 18, wherein the current target steering angle value is calculated based on:
  whether the current output value is greater than or equal to the predetermined threshold, and
  whether the raw target steering angle value is less than or equal to the previously calculated target steering angle value.

20. The system of claim 11, wherein the traction controller controls at least one of a speed of the traction motor or a torque of the traction motor.

\* \* \* \* \*